(12) United States Patent
Akuzawa

(10) Patent No.: US 11,076,063 B2
(45) Date of Patent: Jul. 27, 2021

(54) INFORMATION PROCESSING SYSTEM THAT PERFORMS SYNCHRONIZATION OF INFORMATION RELATED TO DISPLAY OF A BUTTON RELATED TO AN APPLICATION, INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Masao Akuzawa, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 973 days.

(21) Appl. No.: 14/934,471

(22) Filed: Nov. 6, 2015

(65) Prior Publication Data

US 2016/0142569 A1 May 19, 2016

(30) Foreign Application Priority Data

Nov. 18, 2014 (JP) .............................. JP2014-234004

(51) Int. Cl.
*H04N 1/00* (2006.01)
*G06F 3/0482* (2013.01)

(52) U.S. Cl.
CPC ....... *H04N 1/00511* (2013.01); *G06F 3/0482* (2013.01); *H04N 1/00408* (2013.01); *H04N 1/00501* (2013.01); *H04N 2201/0094* (2013.01)

(58) Field of Classification Search
CPC .... G06F 9/44505; G06F 3/0482; G06F 3/048; G06F 16/273; G06F 16/27;
(Continued)

(56) References Cited

U.S. PATENT DOCUMENTS 8,233,177 B2 7/2012 Lawrence et al.
8,239,918 B1 * 8/2012 Cohen ..................... G06F 21/10
726/1
(Continued)

FOREIGN PATENT DOCUMENTS

CN 102196138 A 9/2011
CN 102868841 A 1/2013
(Continued)

OTHER PUBLICATIONS

Office Action issued in Japanese Appln. No. 2014-234004 dated Jul. 30, 2018.
(Continued)

*Primary Examiner* — Sang H Kim
(74) *Attorney, Agent, or Firm* — Rossi, Kimms & McDowell LLP

(57) ABSTRACT

Setting information of a menu screen is registered, the registered setting information, which is a synchronization target, is stored, and a synchronization of the setting information is performed between a server and an information processing apparatus. In a case where an inconsistency occurs between a function corresponding to a button displayed on the menu screen and a display of the button, the display of the button is deleted if synchronization of the setting information between the server and the information processing apparatus is disabled.

16 Claims, 18 Drawing Sheets

(58) Field of Classification Search
CPC .......... G06F 17/30575; H04N 1/00413; H04N 1/00506; H04N 17/30575; H04N 2201/0094; H04L 41/003
See application file for complete search history.

(56) References Cited

U.S. PATENT DOCUMENTS

| | | | |
|---|---|---|---|
| 8,806,375 B2 | 8/2014 | Tomita et al. | |
| 8,874,511 B1* | 10/2014 | Mathias | G06F 16/27 707/620 |
| 9,160,882 B2 | 10/2015 | Hara | |
| 9,678,622 B2 | 6/2017 | Lim et al. | |
| 2003/0130984 A1* | 7/2003 | Quinlan | G06F 9/52 |
| 2007/0271522 A1* | 11/2007 | Son | G06F 3/04847 715/762 |
| 2007/0283011 A1* | 12/2007 | Rakowski | H04L 41/0803 709/225 |
| 2009/0037523 A1* | 2/2009 | Kolke | G06F 17/30873 709/203 |
| 2010/0177341 A1 | 7/2010 | Mihara | |
| 2011/0302479 A1* | 12/2011 | Movida | G06F 11/0709 714/798 |
| 2013/0014017 A1* | 1/2013 | Sato | H04N 1/00464 715/733 |
| 2014/0201145 A1* | 7/2014 | Dorman | G06F 16/27 707/634 |
| 2014/0203999 A1* | 7/2014 | Shim | G06F 3/1454 345/2.2 |
| 2014/0300920 A1 | 10/2014 | Hayashi | |
| 2015/0067611 A1* | 3/2015 | Spohr | G06Q 10/10 715/844 |
| 2015/0172743 A1* | 6/2015 | Itagaki | G08C 17/00 725/56 |

FOREIGN PATENT DOCUMENTS

| | | |
|---|---|---|
| CN | 104104819 A | 10/2014 |
| EP | 2790395 A2 | 10/2014 |
| JP | 2001027984 A | 1/2001 |
| JP | 2009181382 A | 8/2009 |
| JP | 2012168820 A | 9/2012 |
| JP | 2013229036 A | 11/2013 |
| JP | 2014107729 A | 6/2014 |
| KR | 101099262 B1 | 12/2011 |
| KR | 1020130112558 A | 10/2013 |
| WO | 2014112852 A1 | 7/2014 |

OTHER PUBLICATIONS

Office Action issued in Korean Appln. No. 10-2015-0157107 dated Mar. 13, 2018.
Office Action issued in Chinese Appln. No. 201510796586.1 dated Dec. 5, 2017. English translation provided.
Extended European Search Report issued in European Appln. No. 15190119.6 dated Jun. 16, 2016.

* cited by examiner

FIG. 7A

CUSTOM MENU DATA STORED IN SETTINGS SYNCHRONIZATION DB

DATA STRUCTURE FOR ONE USER — 751

| TAG NAME | | | EXPLANATION |
|---|---|---|---|
| Button | | | BUTTON ROOT NODE |
| | 000~* — 752 | | BUTTON NODE |
| | | actID — 753 | ACTION ID KEY |
| | | appID — 754 | APPLICATION ID KEY |
| | | comment — 755 | COMMENT KEY |
| | | name — 756 | BUTTON NAME KEY |
| | | iconID — 757 | ICON ID KEY |

761 —

| Index | | BUTTON INDEX NODE |
|---|---|---|
| | 000~* | BUTTON INDEX KEY |

FIG. 7B

CUSTOM MENU SETTING INFORMATION

| TAG NAME | | | EXPLANATION |
|---|---|---|---|
| ApplicationList | | | APPLICATION LIST NODE |
| | APPLICATION 000~* | | APPLICATION NODE REGISTERED TO CUSTOM MENU |
| | | ApplicationID — 742 | APPLICATION ID |
| | | ApplicationName | APPLICATION NAME |

741 —

| Icon | | | ICON ROOT NODE |
|---|---|---|---|
| | APPLICATION ID | | ICON RECORDED APPLICATION ID NODE |
| | | ICON ID — 782 | ICON ID NODE OF RECORDED ICON |
| | | IconM | ICON M KEY |
| | | IconS | ICON S KEY |

781 —

| BackImage | | BACKGROUND IMAGE NODE |
|---|---|---|
| | N~* — 792 | BACKGROUND IMAGE KEY |

791 —

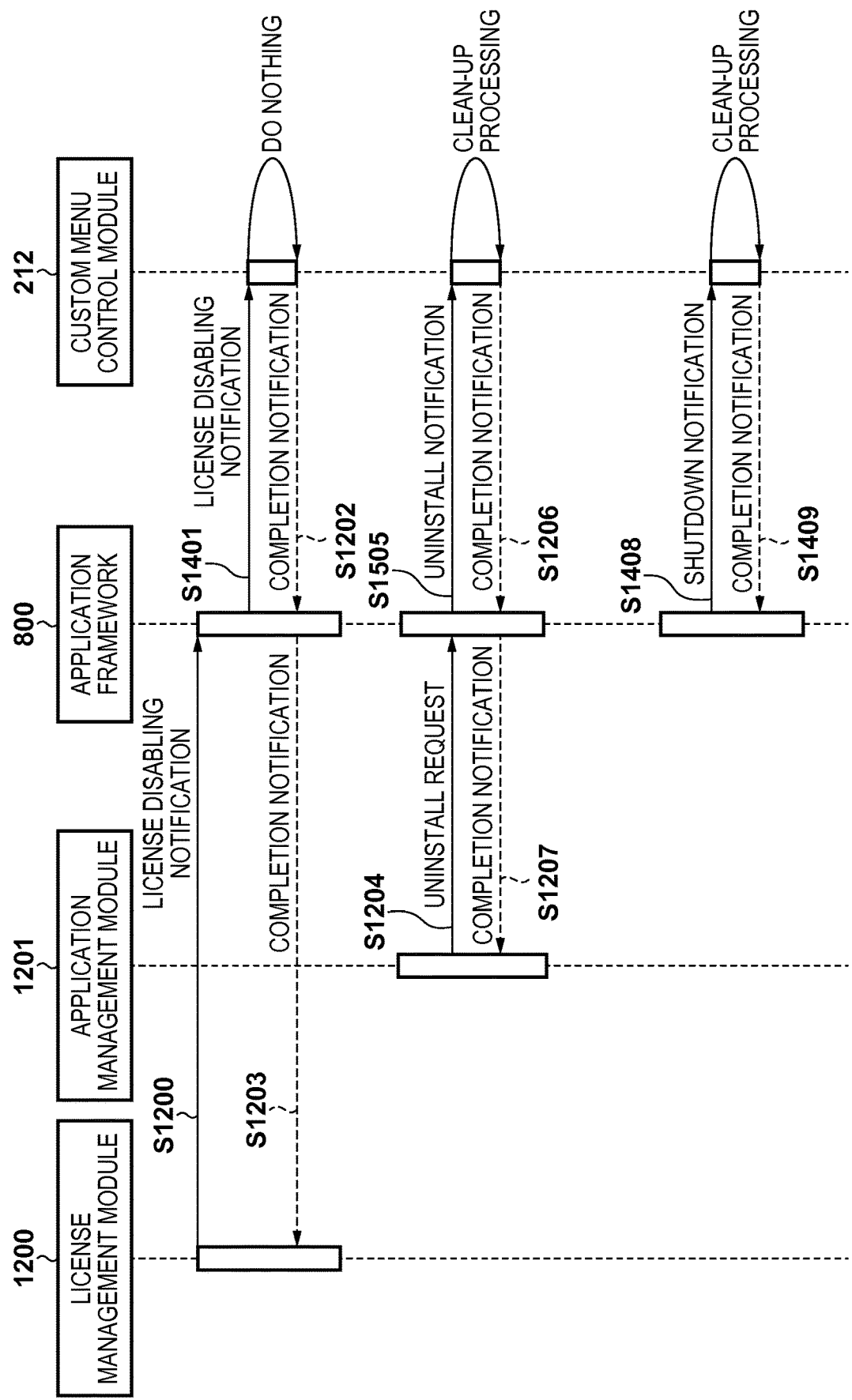

INFORMATION PROCESSING SYSTEM THAT PERFORMS SYNCHRONIZATION OF INFORMATION RELATED TO DISPLAY OF A BUTTON RELATED TO AN APPLICATION, INFORMATION PROCESSING APPARATUS, METHOD OF CONTROLLING THE SAME, AND STORAGE MEDIUM

BACKGROUND OF THE INVENTION

Field of the Invention

The present invention relates to an information processing system, an information processing apparatus, a method of controlling the same, and a storage medium.

Description of the Related Art

In recent years, image forming apparatuses comprise various functions, and operations that users perform on such apparatuses have become complicated. An image forming apparatus is often shared by multiple users, and therefore arrangement is such that setting thereof can be customized in accordance with various use cases. For example, there is a case in which a button, that saves a "double-sided 2-in-1" setting for a copy function, that indicates that a layout setting is "2-in-1" and finishing is "double-sided" in the copy function, is registered to a menu screen of an image forming apparatus. When a user presses the button on the menu screen, a copy function screen is transitioned to, and "2-in-1" and "double-sided" can be set automatically for the copy function. With this, it is possible to eliminate effort of setting for the copy function by a user.

In Japanese Patent Laid-Open No. 2013-229036, it is disclosed that in a case where a function is linked to a menu button (an application) is disabled or uninstalled, the button with which the function is associated is deleted or disabled.

In the above described conventional approach, there are cases in which in an environment such as an office, for example, in which a plurality of image forming apparatus are installed, menu buttons are synchronized between image forming apparatuses. In such a case, when a function that is associated with a button on one image forming apparatus is disabled or uninstalled, a menu button on another image forming apparatus linked therewith is also deleted. For this reason, even in a case where the function is enabled in a state where the function is installed on the another image forming apparatus, the button ceases to be usable on the another image forming apparatus, for example. For this reason, a user of the another image forming apparatus must register the button once again on the another image forming apparatus, and such an operation is bad in terms of usability.

SUMMARY OF THE INVENTION

An aspect of the present invention is to eliminate the above-mentioned problems with conventional technology.

According to a first aspect of the present invention, there is provided an information processing system including a server and a plurality of information processing apparatuses, wherein the server comprises: a storage unit configured to store setting information of a menu screen of the plurality of information processing apparatuses, and each of the plurality of information processing apparatuses comprises: a registration unit configured to register setting information of a menu screen displayed on the information processing apparatus; a storing unit configured to store setting information which is a synchronization target and is registered by the registration unit; a synchronization control unit configured to perform a synchronization of the setting information between the server and the storing unit; and a control unit configured to, in a case where an inconsistency occurs between a function corresponding to a button displayed on the menu screen and a display of the button, control to delete the display of the button if synchronization by the synchronization control unit is disabled.

According to a second aspect of the present invention, there is provided an information processing apparatus for communicating with a server, the apparatus comprises: a display unit configured to display a menu screen; a registration unit configured to register setting information related to the display of the menu screen; a storage unit configured to store setting information which is a synchronization target and is registered by the registration unit; a synchronization control unit configured to perform a synchronization of the setting information between the server and the storage unit; and a control unit configured to, in a case where an inconsistency occurs between a function corresponding to a button displayed on the menu screen and a display of the button, control to delete the display of the button if synchronization by the synchronization control unit is disabled.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7A and 7B depict views for explaining data structures that the custom menu control module handles which are registered in a settings synchronization DB of the MFP according to the first embodiment.

FIG. 15 is a sequence diagram for describing a procedure for a case in which a function of the MFP (an application) is disabled or uninstalled according to a third embodiment of the present invention.

DESCRIPTION OF THE EMBODIMENTS

Figure 1:
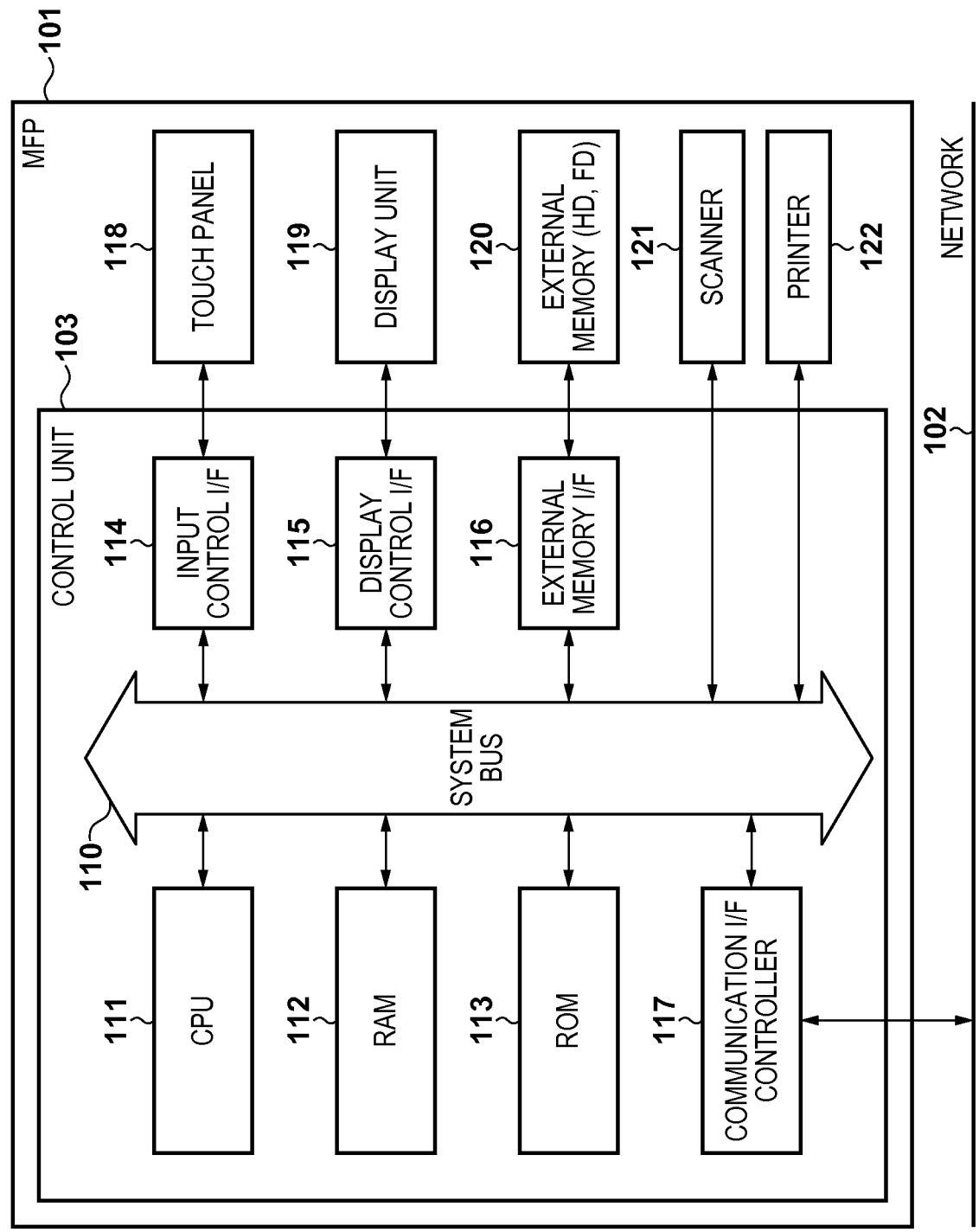
FIG. 1 depicts a view for illustrating an example of a hardware configuration of a multi-function peripheral (MFP) according to a first embodiment of the present invention.

Embodiments of the present invention will be described hereinafter in detail, with reference to the accompanying drawings. Note that the same reference numerals denote the same or like components throughout the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

FIG. 1 depicts a view for describing an example of a hardware configuration of a multi-function peripheral (MFP) 101 according to the first embodiment of the present invention. Note that FIG. 1 merely illustrates an example of an image forming apparatus according to the embodiment, and therefore other components may be included, and elements that have the same effect as the embodiment may be included.

A control unit 103 comprises a CPU 111, a RAM 112, a ROM 113, an input control I/F 114, a display control I/F 115, an external memory I/F 116, and a communication I/F controller 117, and these are connected to each other via a system bus 110. Also, a scanner 121, a printer 122, or the like, are connected to the system bus 110. Units connected to the system bus 110 can perform exchange of data with each other via the system bus 110.

The CPU 111, in accordance with a program stored in the ROM 113, performs control of units via the system bus 110, and performs calculation, processing, or the like, of data. The RAM 112 is a volatile memory, and is used as a temporary storage area for a main memory of the CPU 111, a work area, or the like. The ROM 113 is a non-volatile memory, and stores image data, other data, and various programs for the CPU 111 to operate in respective predetermined regions. The CPU 111, in accordance with a program stored in the ROM 113, for example, controls each unit of the MFP 101 using the RAM 112 as a work memory. Note that a program for the CPU 111 to operate is not limited to the ROM 113, and may be stored in an external memory 120, deployed into the RAM 112 and executed.

The input control I/F 114 accepts user operations, generates control signals in accordance with those operations and supplies the CPU 111 with those signals. For example, the input control I/F 114 controls an interface with an input device such as a keyboard (not shown), a pointing device, a touch panel 118, or the like, as an input device that accepts user operations. Note that the touch panel 118 is an input device for outputting coordinate information corresponding to a position that is contacted on an input unit configured in a plane, for example. The CPU 111 controls each unit of the MFP 101 in accordance with a program based on control signals generated and supplied by the input control I/F 114 in accordance with user operations performed on an input device. With this, it is possible to cause the MFP 101 to perform operations in accordance with user operations. The display control I/F 115 outputs a display signals for causing a display unit 119 to display an image. For example, the CPU 111, in accordance with a program, supplies the display control I/F 115 with a display control signal generated in accordance with a program. The display control I/F 115 generates display signals based on the display control signal, and causes the display unit 119 to display by outputting the signals to the display unit 119. For example, the display control I/F 115 causes the display unit 119 to display a GUI screen that configures a GUI (Graphical User Interface) based on the display control signal that the CPU 111 generates. Also, the touch panel 118 may be comprised integrally in the display unit 119. For example, the touch panel 118 may be configured so that a transmittance of light does not obstruct the display of the display unit 119, and be attached to an upper layer of a display surface of the display unit 119. Input coordinates of a position that a user operates on the touch panel 118 are associated with display coordinates on the display unit 119. With this, a GUI can be provided such that it is though the user is directly operating a screen displayed on the display unit 119.

To the external memory I/F 116, the external memory 120, which may be an HDD (hard disk drive), a flexible disk, a CD, a DVD, a flash memory, a memory card, or the like, for example, can be connected. Based on control by the CPU 111, reading of data from the external memory 120, and writing of data to the external memory 120 are performed. Depending of the configuration, it is also possible that the external memory 120 be used in place of the ROM 113. The communication I/F controller 117, based on control by the CPU 111, performs communication with various networks, such as a LAN, the Internet, a wired network, a wireless network, or the like, for example. To a network 102, various apparatuses such as a PC, other MFPs, a printer, a server are connected to be able to communicate with the MFP 101.

The scanner 121, based on control by the CPU 111, reads an original, and generates image data of the original. For example, the CPU 111 causes the scanner 121 to execute scan processing upon a user instruction input via the input control I/F 114. With this, the scanner 121 conveys and reads an original placed on an original platen or an original placed on an ADF (Automatic Document Feeder), and generates image data by digitizing an image signal obtained by the reading. Then, when the generated image data is supplied via the external memory I/F 116, the CPU 111 stores the image data in the external memory 120, for example. The printer 122, based on control by the CPU 111, prints based on the image data stored in the external memory 120, for example. For example, the CPU 111 causes processing for printing on the printer 122 to be executed upon a user instruction input via the input control I/F 114, an instruction of a command input from an external apparatus via the communication I/F controller 117, or the like. The printer 122 accepts image data that is read from the RAM 112 or the external memory 120 and supplied, and prints the image data onto a sheet.

Figure 2:
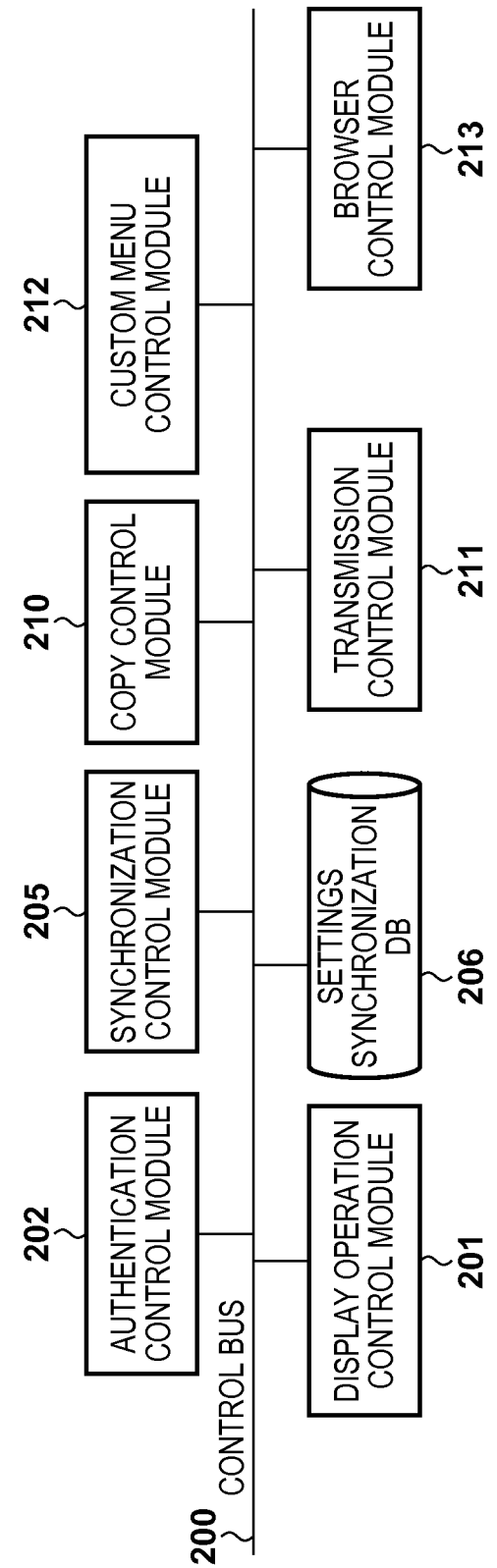
FIG. 2 is a block diagram for explaining a software configuration of the MFP according to the first embodiment.

FIG. 2 is a block diagram for explaining a software configuration of the MFP 101 according to the first embodiment. Note that FIG. 2 merely illustrates an example for explanation in the first embodiment, and other components may be included, and elements that have the same effect as the first embodiment may be included. Also, each control module illustrated in FIG. 2 is realized by the CPU 111 executing a program stored in the ROM 113 or the external memory 120.

To a control bus 200, various control modules such as a display operation control module 201, an authentication control module 202, a synchronization control module 205, a copy control module 210, a transmission control module 211, a custom menu control module 212, and a browser control module 213, for example, are connected. The control bus 200, based on control by the CPU 111, transfers information between the control modules. The MFP 101 comprises at least one function, and there is a control module for each function; in FIG. 2, the copy control module 210, the transmission control module 211, the custom menu control module 212, and the browser control module 213 are illustrated as examples. As a matter of course, respective control modules (not shown) exist for functions other than those illustrated in FIG. 2. An example of another function is a secure print function which is a function by which a print job that is inputted from a driver, for example, is stored in the MFP 101, and only an authenticated user or a user who knows a password linked to the print job is able to print it. Also, there is a box function having a function for saving image data in the MFP 101, a help function having a function for displaying a help screen, a fax function for receiving a FAX document from a public communication network, or the like.

The display operation control module 201 controls the input control I/F 114, the display control I/F 115, or the like, based on control by the CPU 111. For example, the display operation control module 201 displays to the display unit 119 via the display control I/F 115 based on an instruction from another control module, or obtains information that a user inputted by the touch panel 118 via the input control I/F 114. Note that the display operation control module 201 communicates obtained information to control modules via the control bus 200 as necessary. In the explanation hereinafter, when information, data, or the like, is transferred between control modules, it passes through the control bus 200.

The authentication control module 202, based on control by the CPU 111, performs authentication processing (hereinafter referred to as "log in") in order to identify a user, and determines whether or not an operator of the MFP 101 is a legitimate user of the MFP 101. Also, the authentication control module 202 references a database in which user information is stored which is arranged in the external memory 120. In login processing, it is determined whether or not a correspondence relationship between a user name and a password is correct, and if it is correct, the login processing succeeds, and it becomes possible to use the functions of the MFP 101 as a legitimate user within a scope of given permissions. Meanwhile, if the login processing fails, control is performed such that as an unauthenticated user, the functions of the MFP 101 can be used within the scope of more restricted permissions, or none of the functions can be used. Note that the method of authenticating the user is not limited to this, and other authentication methods such as those that use a non-contact type IC card, or the like, may be used.

Next, explanation will be given of the copy control module 210. The copy control module 210 controls a function (hereinafter referred to as the copy function) for reading an original, and then printing an image of the original. The copy control module 210 generates image data by the scanner 121 reading an original, performing image processing of the image data by an image processing unit (not shown), and printing the processed image data by outputting it to the printer 122. As an example of settings in the copy function, there is a layout (N-in-1) setting for generating a copy image from N originals, and a double-sided print setting for designating whether to read one side of an original or both sides. Furthermore, there is a color mode setting for color designation for printing in full color, monochrome, a single color, or the like.

Next, explanation will be given for the transmission control module 211. The transmission control module 211 controls a function (hereinafter referred to as a transmission function) for transmitting to an external server image data obtained by reading an original by the scanner 121. The transmission control module 211 generates image data by the scanner 121 reading an original, performs image processing on the image data by an image processing unit (not shown), and generates a file in a common file format such as the JPEG, a TIFF, or the like, for example. Then, the generated file is sent to a server, for example, or is attached to an electronic mail and sent.

Next, explanation will be given of the browser control module 213. The browser control module 213 obtains resources by communicating with the Web server via the network 102. Then, the CPU 111 performs a syntax analysis based on the type of the obtained resource, and outputs a screen in which text, images, or the like, are arranged appropriately to the display unit 119 via the display control I/F 115. An example of usage of the browser function is when the browser control module 213 issues an HTTP request to a server having a document management function, analyzes a scan request set in a response thereto, and issues a scan request to the scanner 121. Then image data that the scanner 121 obtains is registered to the server as document data.

Next, explanation will be given of the custom menu control module 212. The custom menu control module 212 stores settings of other functions, and controls functions registered as buttons on a menu screen that is customizable. The custom menu control module 212, by instructing that a function be registered to a button after setting the function, registers a shortcut button for the function to a custom menu screen (for example, FIG. 4A). Detailed explanation of the custom menu screen will be explained later.

Figure 3:
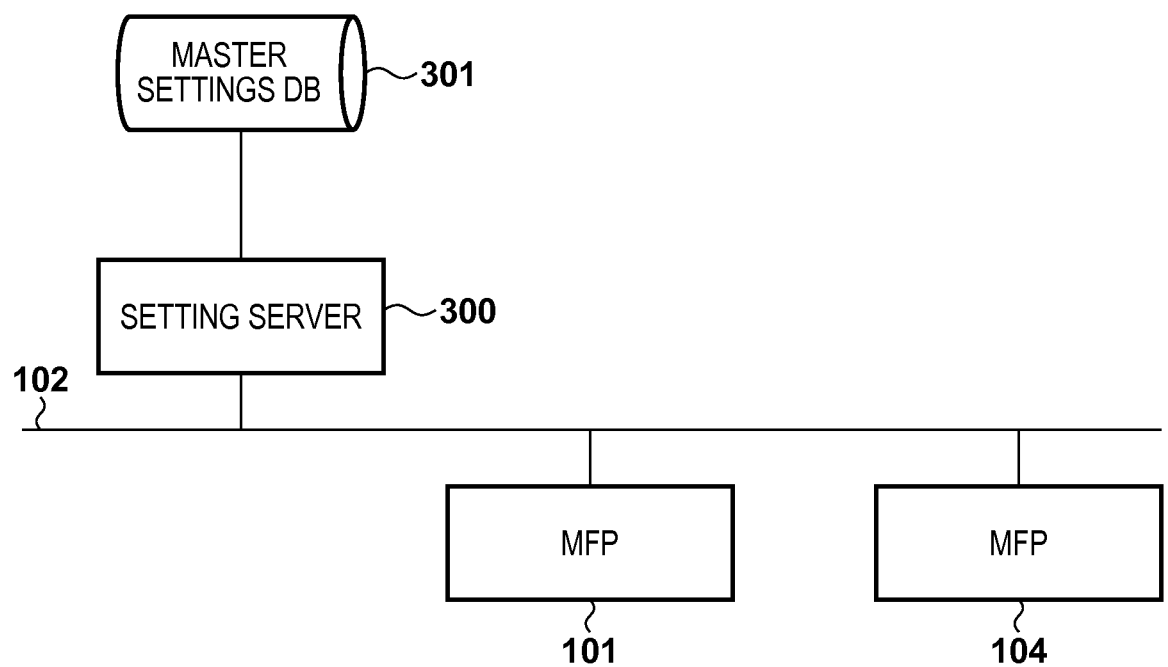
FIG. 3 depicts a view for illustrating an example of configuration of an information processing system including MFPs according to the first embodiment.

The synchronization control module 205, when the CPU 111 detects a change of a settings synchronization database (DB) 206, transmits information of differences in setting information between a master settings DB 301 (FIG. 3) and the settings synchronization DB 206 via the network 102 to a setting server 300 (FIG. 3). Note that the synchronization control module 205 has an arrangement for detecting update content in units of nodes (attributes), and in the first embodiment defines this update content as difference information. The settings synchronization DB 206 is synchronized with the master settings DB 301 of the setting server 300 by the synchronization control module 205, stores MFP specific setting information that functions of the MFP 101 use, and is arranged in the RAM 112 or the external memory 120.

FIG. 3 depicts a view for describing an example of configuration of an information processing system including the MFP 101 according to the first embodiment. Note that FIG. 3 merely illustrates an example for explanation in the first embodiment, and other components may be included, and elements that have the same effect as the first embodiment may be included. Also, the MFP 101 or an MFP 104 may also serve as the component of the setting server 300.

In this information processing system, the setting server 300, the MFP 101, and the MFP 104 are connected via the network 102. The setting server 300 stores setting information (device settings) for each MFP, and personal settings in the master settings DB 301. The hardware configuration and the software configuration of the MFP 104 are equivalent to configurations of the MFP 101. The synchronization control module 205 of the MFP 101 notifies the setting server 300 of a node including update content when an update of setting information of the settings synchronization DB 206 of the MFP 101 is detected. The MFP 104 queries the setting server 300 as to whether setting information is changed (updated), and when setting information is changed, obtains the changed setting information from the setting server 300. With this, the update content of the setting information in the MFP 101 is reflected in the MFP 104.

Note that in the MFP 101, when a user changes setting information, the synchronization control module 205 of the MFP 101 synchronizes with the setting server 300, but configuration may also be taken such that this is not performed whenever the setting information is changed, and rather setting information is synchronized at a predetermined timing set in advance, for example. Also, configuration may also be taken such that setting information is synchronized automatically when the user logs out.

Also, the timing of synchronization of the settings synchronization DB 206 of the MFP 104 and the master settings DB 301 of the setting server 300 may be upon log in, upon log out, at a designated time, upon a predetermined amount of time period elapsing, at a designated date/time, at a timing that a user designates, or the like. Also, a mode in which it is possible to designate which of these synchronization timings is set may be arranged. Also, the MFPs make a request to the setting server 300 via the network 102 as to the existence/absence of difference information, and in a case where there is difference information, that data is obtained as a response, and the settings synchronization DB 206 is updated. In other words, the synchronization control module 205 performs control to communicate with the setting server 300 via the communication I/F controller 117, and synchronize setting information stored in the settings synchronization DB 206 and setting information stored in the master settings DB 301 of the setting server 300.

Note that in the first embodiment, setting information related to the custom menu control module 212 is handled as data included in the settings synchronization DB 206, but it is possible to execute similarly for setting information related to other functions as well.

Figure 4A:
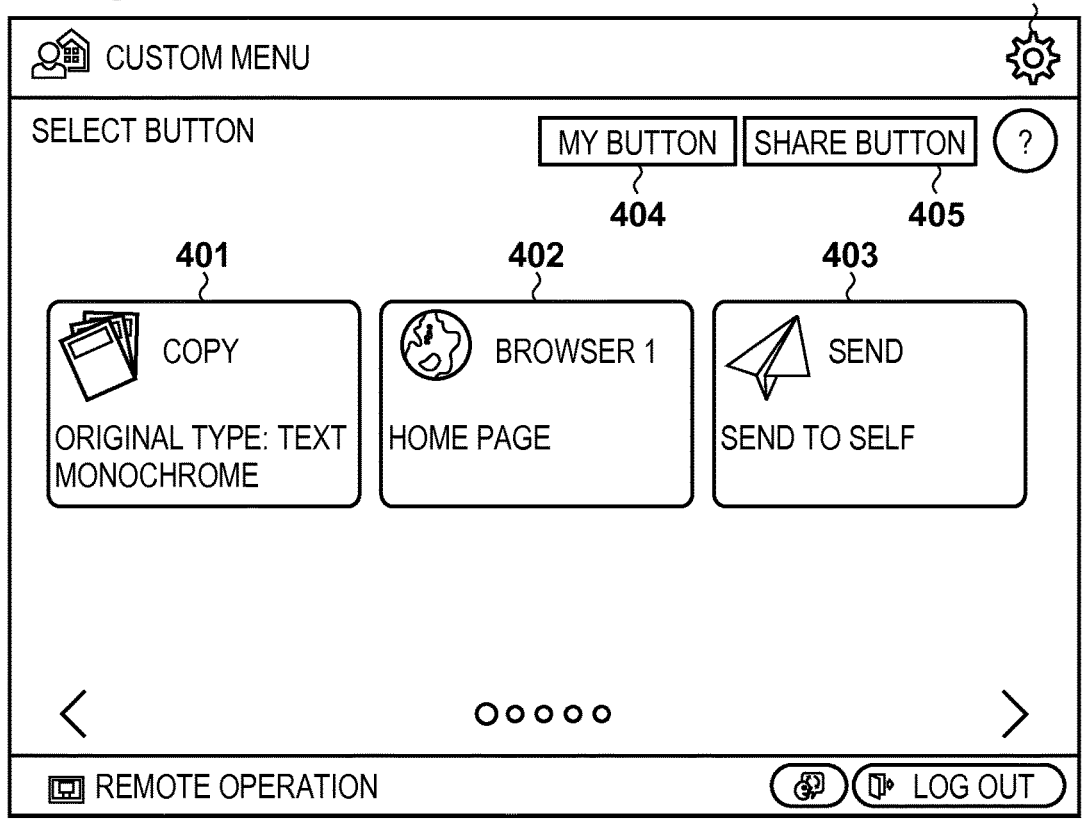
FIGS. 4A and 4B and FIGS. 5A and 5B respectively depict views for illustrating examples of a custom menu screen provided by a custom menu control module of the MFP according to the first embodiment.

FIG. 4A depicts a view for illustrating an example of a custom menu screen provided by the custom menu control module 212 of the MFP 101 according to the first embodiment.

The custom menu screen is something that is generated by the custom menu control module 212, and 3 buttons (buttons 401-403) are comprised on the screen. The button 401 is a button for transitioning to the copy control module 210. The button 402 is a button for transitioning to the browser control module 213. The button 403 is a button for transitioning to the transmission control module 211. Also, a my button 404 is a button for displaying a dedicated button managed for each user which is linked to the log in of the authentication control module 202. A share button 405 is a button for displaying buttons that all users can use commonly, even when log in by the authentication control module 202 is not completed (i.e., unauthenticated users). Note that a mechanism by which the authentication control module 202 can manage a plurality of user in units of groups may be provided, and a group button for displaying buttons that can be used for each group may be added.

When the custom menu control module 212 detects that one of the buttons 401-403 is pressed via the input control I/F 114, the custom menu control module 212 makes a call request together with setting information obtained from the settings synchronization DB 206 to a corresponding control module. For example, the custom menu control module 212 makes a request to call the copy function to the copy control module 210 when the custom menu control module 212 detects that a copy button 401 is pressed. With this, the copy control module 210 causes a confirmation dialog illustrated in FIG. 4B, for example, to be displayed on the display unit 119.

Figure 4B:
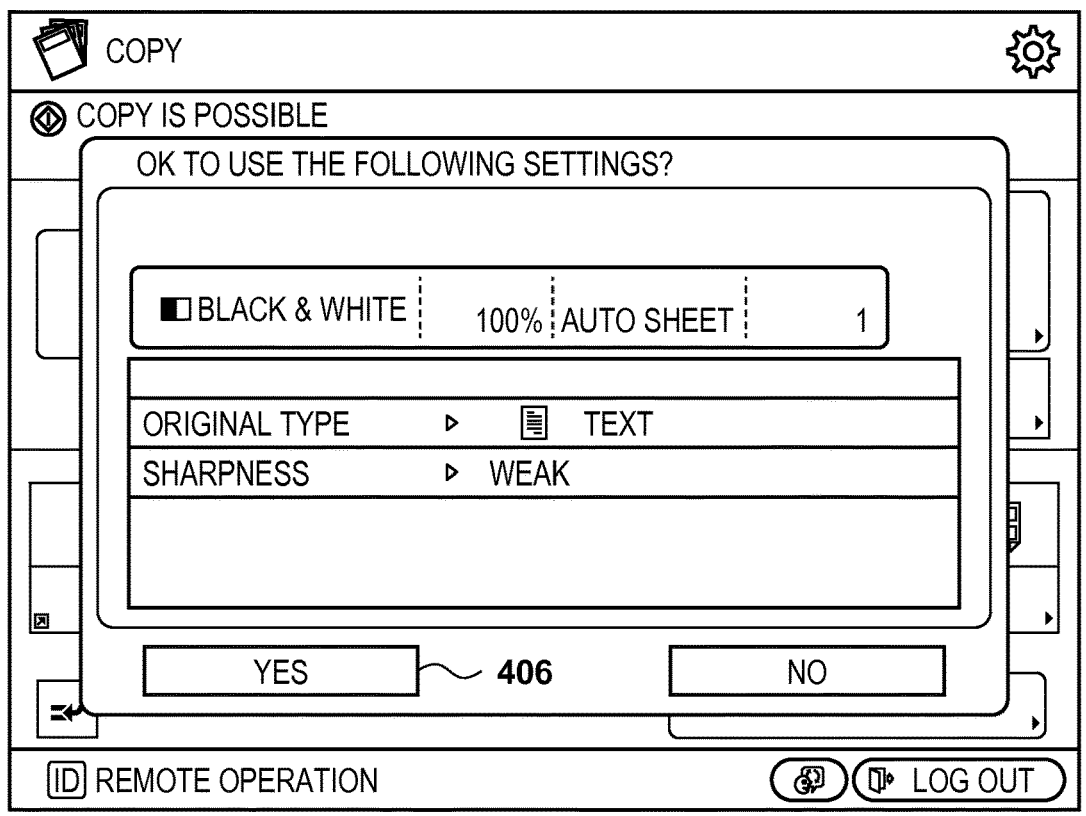

FIG. 4B depicts a view for illustrating an example of displaying a confirmation dialog when the copy button 401 is instructed on the screen of FIG. 4A.

Figure 6:
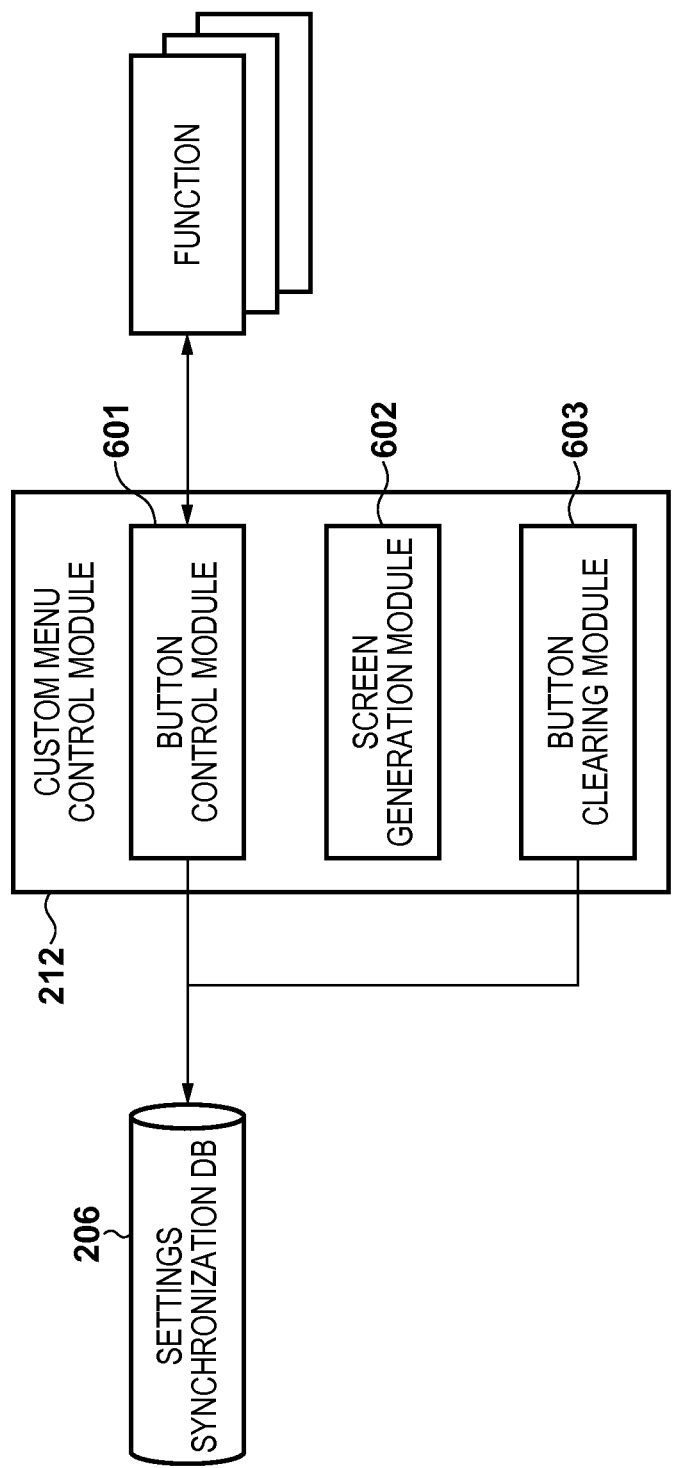
FIG. 6 is a block diagram for explaining a software configuration a custom menu control module of the MFP according to the first embodiment.

Here, it is indicated that setting information such as monochrome, the type of the original, or the like, is passed to the copy control module 210 via a button control module 601 (FIG. 6). At this point, setting information is passed to the copy control module 210 from the button control module 601 in an XML format such as follows, for example.

```
<?xml version="1.0" encoding="UTF-8"?>
<ACTION ID> 001 </ACTION ID>
<SETTING INFORMATION>
<COLOR SELECTION> monochrome </COLOR SELECTION>
<DENSITY> 0 </DENSITY>
<SCALING FACTOR> full size </SCALING FACTOR>
<PAPER SELECTION> automatic </PAPER SELECTION>
<ORIGINAL TYPE> text </ORIGINAL TYPE>
</SETTING INFORMATION>
```

Note that, ACTION ID is information for identifying setting information of a function linked to a button node 752 (FIG. 7A). For the structure of the data that the custom menu control module 212 handles, detailed explanation is given with reference to FIGS. 7A and 7B.

When the copy control module 210 detects the pressing of a "YES" button 406 of FIG. 4B, the copy control module 210 displays a copy screen (FIG. 5A) in which the above described setting information is reflected via the display control I/F 115 to the display unit 119.

Figure 5A:
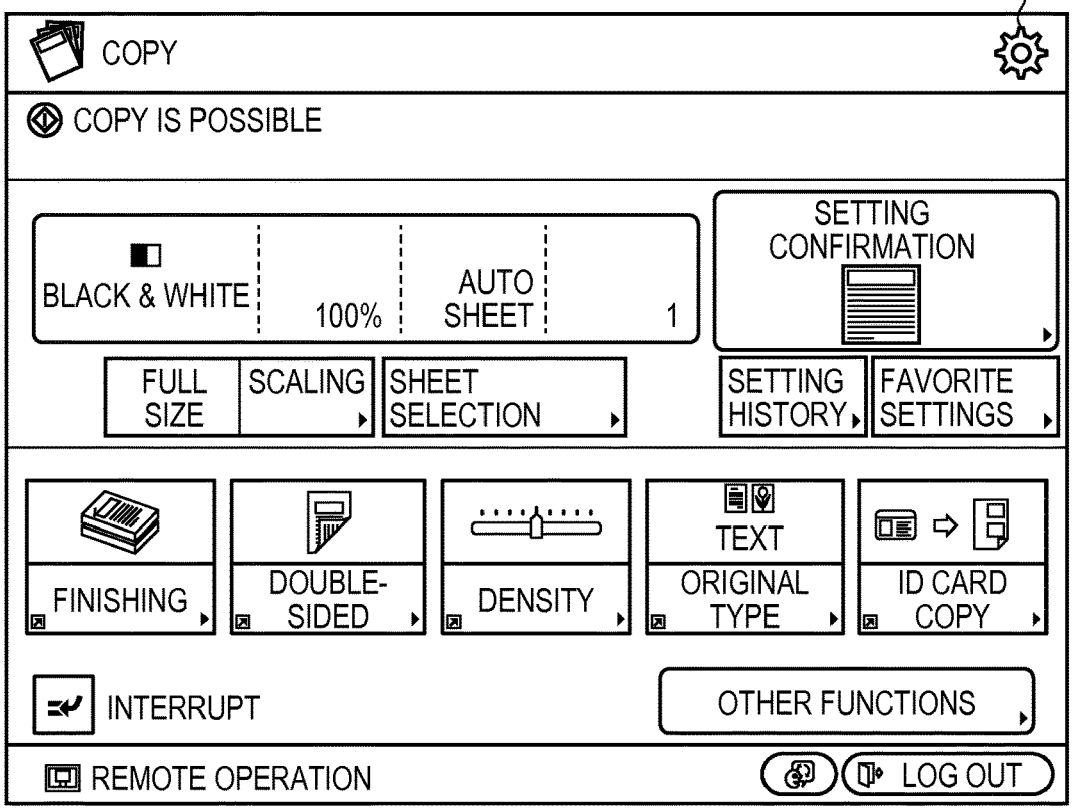
Figure 5B:
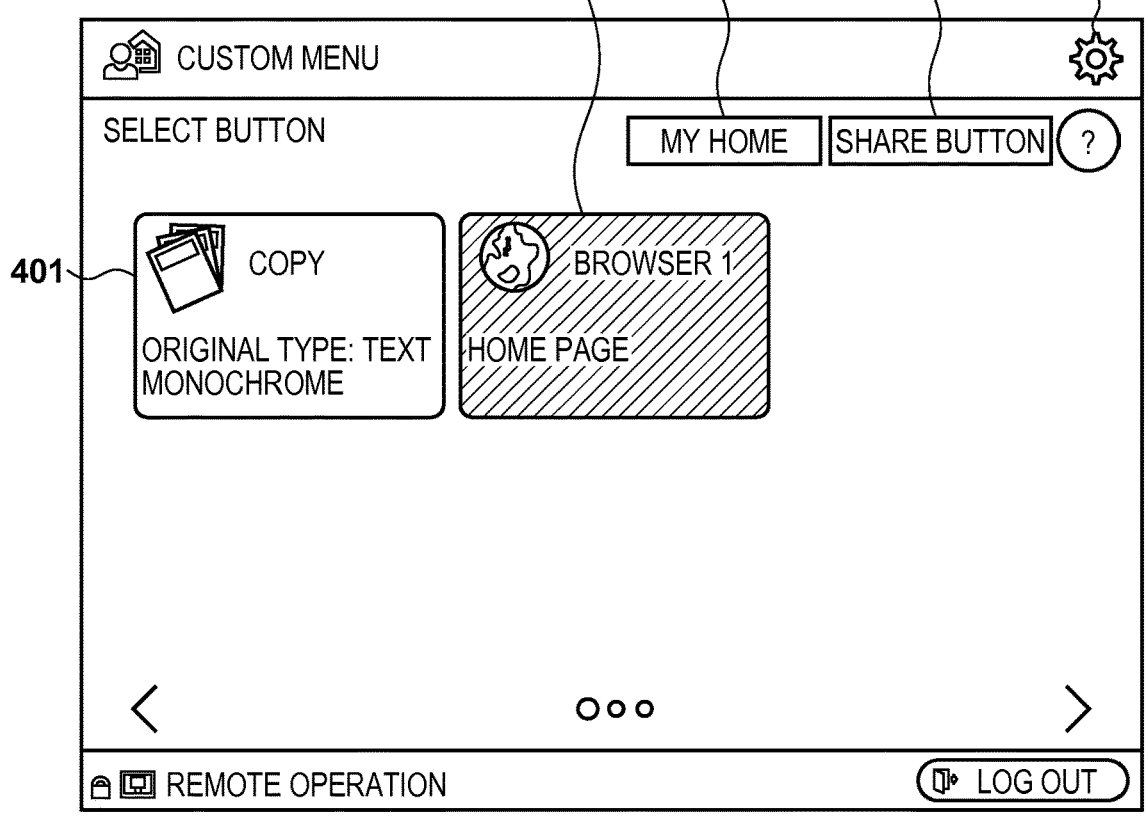

Also, when a setting button 440 is pressed on the screen of FIG. 5A, the custom menu control module 212 detects that the setting button 440 is pressed, and displays a custom menu screen illustrated on FIG. 5B.

FIG. 5B depicts a view for illustrating when a state in which the button 402 is grayed out and cannot be selected is entered because a state in which the button 402 is inconsistent is entered. Note that the inconsistent state indicates a state in which a function (application) corresponding to the button 402 is uninstalled or disabled. Note that the inconsistent state is cancelled when a state in which the function can be used is entered, and at that time a state in which the button can be selected is returned to. Note that in FIG. 5B, portions common to FIG. 4A are denoted with the same reference numerals.

FIG. 6 is a block diagram for explaining a software configuration of the custom menu control module 212 of the MFP 101 according to the first embodiment.

The custom menu control module 212 includes the button control module 601, a screen generation module 602, and a button clearing module 603. The button control module 601 sets information related to a button to the settings synchronization DB 206 along with a request for registration of the button from a function. Also, accompanying a user pressing a button on a menu screen, setting information related to the button is read from the settings synchronization DB 206, and a function matching an application ID key 754 (FIG. 7A) is called. Here, setting information linked to an ACTION ID key 753 (FIG. 7A) is communicated to the function. With this, for the function, setting information that the user desires can be reflected.

The screen generation module 602 generates a screen that the custom menu control module 212 displays to the display unit 119. For example, a button is arranged on a background image that is selected, and in accordance with a layout, the custom menu screen of FIG. 4A is generated, for example. Generation of the custom menu screen will be explained later.

The button clearing module 603 performs a clean-up of a button that is inconsistent when from an application framework 800 (FIG. 8) a notification of a change of a status of a function (for example, a deletion of a function), a notification or an activation request/end request towards the custom menu control module 212, or the like is received. Here, an inconsistent button indicates that a state is such that a function linked to the button ceases to exist. When such a state in entered, the button clearing module 603 determines whether a function of synchronizing a button by the synchronization control module 205 is enabled or disabled, and deletes the button from the settings synchronization DB 206 only when the synchronization function is disabled.

Next, with reference to FIGS. 7A and 7B, explanation will be given for a data structure that is registered to the settings synchronization DB 206 and which the custom menu control module 212 handles.

In the settings synchronization DB 206, as is illustrated in FIGS. 7A and 7B, data exists for each user for the custom menu control module 212, and this data can be referenced only when authenticated by the authentication control module 202.

A button root node 751 comprises the button node 752 for every button. In the button nodes 752, information relating to buttons displayed in a menu screen are stored, and the ACTION ID key 753, the application ID key 754, a comment key 755, a button name key 756, and an icon ID key 757 are included. The ACTION ID key 753 is identification information for referencing information of a setting of a function linked to the button node 752 from the settings synchronization DB 206, and may be of a form of a file path. The application ID key 754 is information for identifying a function comprising an actual function of the button, and is unique for each function. The comment key 755, the button name key 756, or the like, are identification information that links a comment, character information of name, or the like, which is displayed on a button of the custom menu screen of FIG. 4A. However, a character string itself may be stored rather than the identification information. The icon ID key 757 matches an icon ID node 782 of FIG. 7B, and is identification information for determining an icon of a button.

For a button index node 761, a button index key exists for every button, and the button index key indicates the button node 752. For example, if a button index key is "0" and indicates number 6 of the button node 752, it means that the 6-th button node 752 is the copy button 401 because the copy button 401 is at a head position in the custom menu screen of FIG. 4A.

Next, explanation is given below for information of settings of a custom menu of FIG. 7B.

An icon root node 781 is a region for storing an icon registered in the custom menu control module 212 from a function.

A background image node 791, along with a request for registration of a background image, comprises a background image key 792 which is information that references a background image that the custom menu control module 212 comprises.

Figure 8:
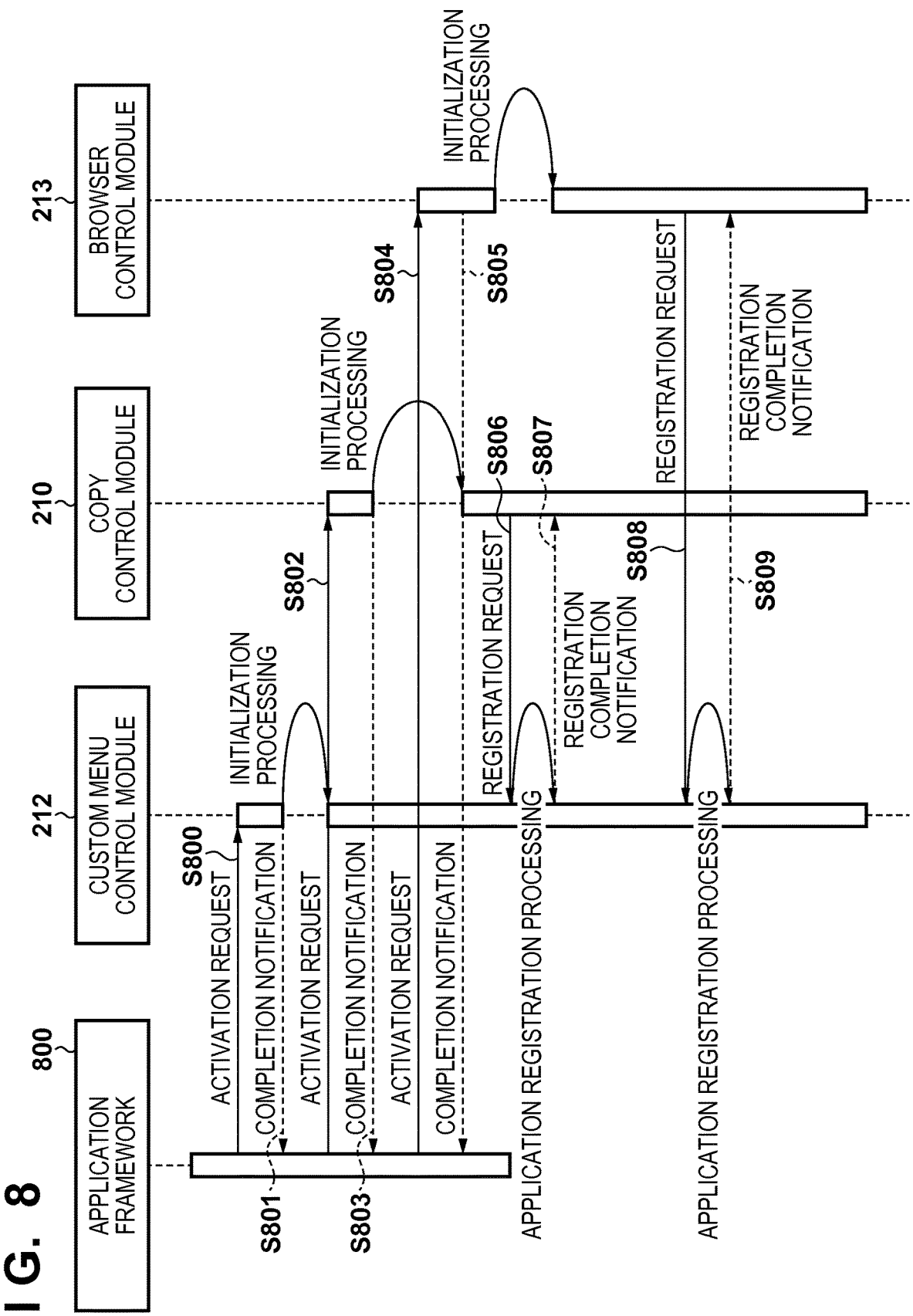
FIG. 8 is a sequence diagram for describing a procedure for registering a function upon an activation of the MFP according to the first embodiment.

FIG. 8 is a sequence diagram for describing a procedure for registering a function upon an activation of the MFP 101 according to the first embodiment. This procedure is executed under the control of the CPU 111 of the MFP 101. Note that the application framework 800 recited in FIG. 8 manages a life cycle (start, stop, resume, end, or the like) of a function (application), and therefore is something that first operates upon an activation of the MFP 101. The application framework 800 is a kind of boot module of the MFP 101 existing in the ROM 113 or the external memory 120.

Here, explanation is given of an example of the custom menu screen illustrated in FIG. 4A. Firstly, in step S800, the application framework 800 performs an activation request towards the custom menu control module 212. With this, the custom menu control module 212 obtains setting information from the settings synchronization DB 206, and causes a thread for performing an update process as necessary to activate as an initialization process. Then, in step S801 the custom menu control module 212 notifies a completion notification to the application framework 800 when the activation of the thread completes. Continuing on, in step S802 and in step S804, the application framework 800 makes consecutive activation requests to the copy control module 210 and the browser control module 213. When completion notifications from the respective functions are received in step S803 and in step S805, processing is ended. Note that in initialization processing for the copy control module 210 and the browser control module 213, threads are respectively generated for performing initialization processing for each function similarly to the initialization processing of the custom menu control module 212. Then when that is completed, a completion notification is notified to the application framework 800.

The copy control module 210 makes a request for registration of a function to the custom menu control module 212 in step S806 in the middle of this initialization processing. In response to this, the custom menu control module 212 responds with a registration completion notification to the copy control module 210 in step S807 after executing the registration processing for the function. Note that in the registration request of step S806, an application ID, an application name and an icon are passed to the custom menu control module 212. Then, in the browser control module 213, similarly in the initialization processing, a request for registration of a function to the custom menu control module 212, registration processing, and the registration completion notification are executed (step S808, step S809). Note that in FIG. 8, a sequence corresponding to the transmission control module 211 is not shown graphically because it would be redundant; please take note that it traces an activation sequence that is similar to that of a function such as that of the copy control module 210.

Figure 9:
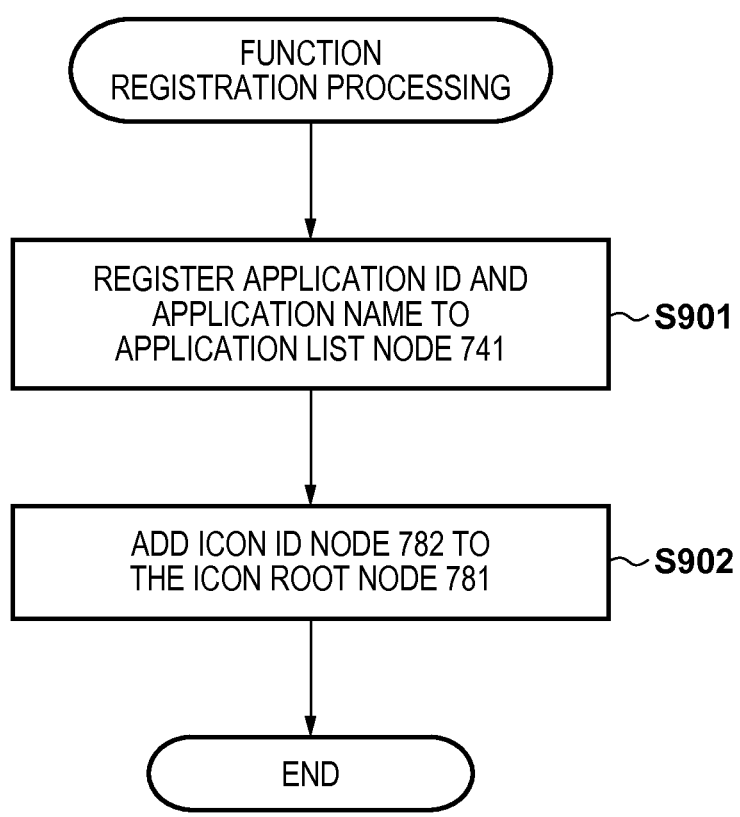
FIG. 9 is a flowchart for describing processing for registration of a function by the custom menu control module of the MFP according to the first embodiment.

FIG. 9 is a flowchart for describing processing for registration of a function of the custom menu control module 212 of the MFP 101 according to the first embodiment. Also, this processing is realized by the CPU 111 executing a program stored in the ROM 113.

Firstly, in step S901, the CPU 111 registers the application ID and the application name, which is information that is passed upon the request for registration from the function (application) to an application list node 741 (FIG. 7B). Next, the processing proceeds to step S902, and the CPU 111 registers the icon ID node 782 to the icon root node 781 linking the icon passed upon the request for registration from the function with the application ID of the function of the call source, and the processing ends.

When the function is registered in this way, the application corresponding to the function and the icon are associated, and registered to the settings synchronization DB 206.

Figure 10:
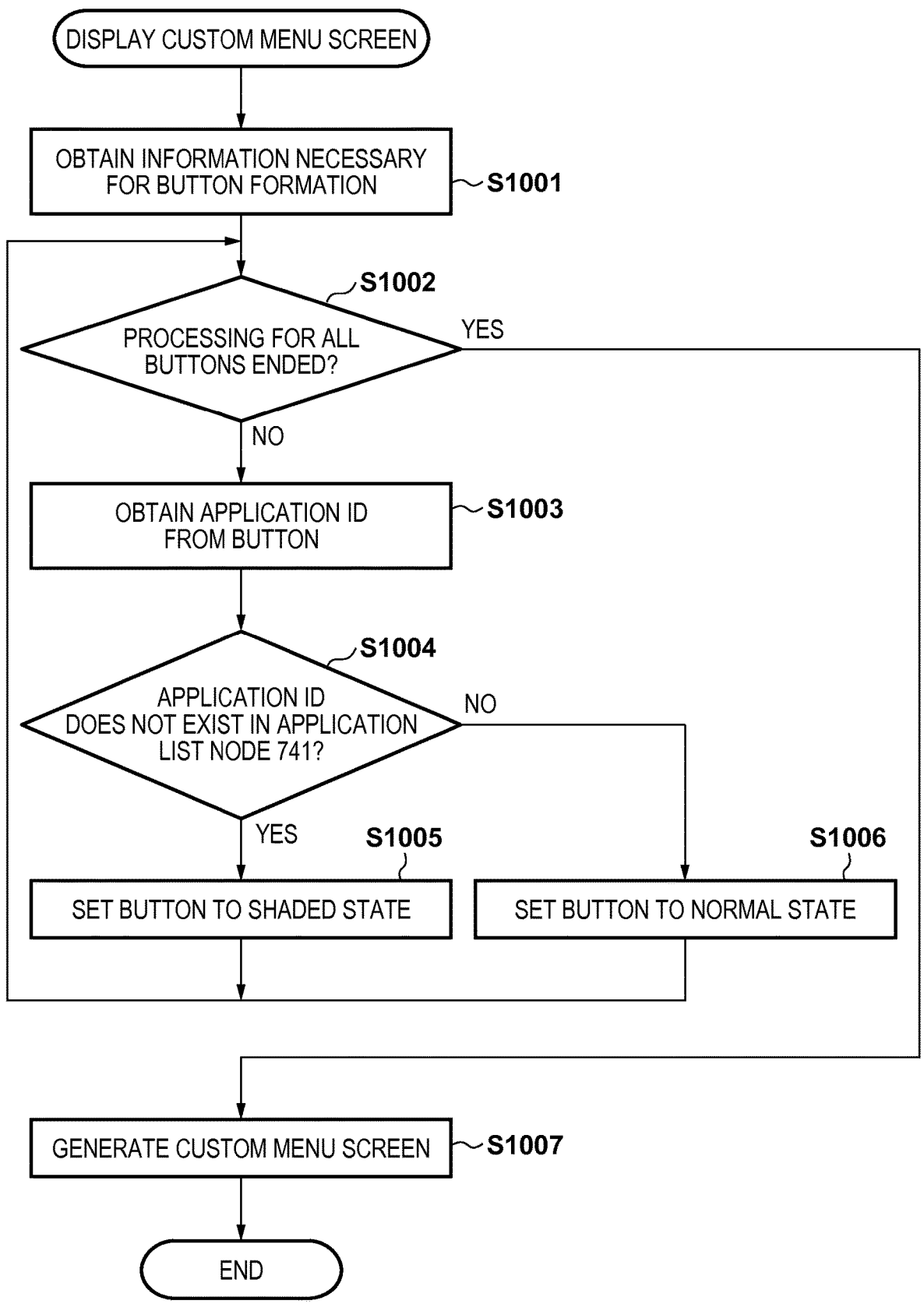
FIG. 10 is a flowchart for describing processing for generating the custom menu screen by a screen generation module of the MFP according to the first embodiment.

FIG. 10 is a flowchart for describing processing for generating a custom menu screen by the screen generation module 602 of the MFP 101 according to the first embodiment. Also, this processing is realized by the CPU 111 executing a program stored in the ROM 113 or the external memory 120.

Firstly, in step S1001, the CPU 111 reads all of the button nodes 752 from the button root node 751 of the settings synchronization DB 206. Then, information (the comment key 755, the button name key 756, and the icon ID key 757) necessary for forming buttons arranged on the custom menu screen is obtained. Then, the CPU 111 reads the button index node 761 from the settings synchronization DB 206, and determines what button will be arranged in which position. Furthermore, the CPU 111 obtains the background image to be displayed from the background image node 791.

Next, the processing proceeds to step S1002, and the CPU 111 determines whether or not confirmation for changing the display form of buttons depending on the existence/absence of corresponding functions (applications) for all of the button nodes obtained in step S1001 has ended for all button nodes. When it is determined that it has not ended here, the processing proceeds to step S1003, and the CPU 111 obtains the application ID key 754 of the button node 752. Next, the processing proceeds to step S1004, and the CPU 111 determines whether or not the application ID key 754 exists in the application list node 741. In a case where it is determined that the application ID key 754 does not exist, the processing proceeds to step S1005, and setting is performed so that the button cannot be pressed (for example, as the button 402 of FIG. 5B). Note that the display form of the button in this case is not limited to semi-transparency (gray-out), and it is sufficient that a display form informs the user that it cannot be used, by changing the icon to a "?" or by not displaying the button; please take note that this is not particularly limited. Meanwhile, in a case where it is determined in step S1004 that the application ID key 754 exists, the processing proceeds to step S1006, setting is performed so a state in which the button (for example, as the button 401 of FIG. 5B) can be selected is entered, and the processing returns to step S1002.

Also, in a case where the CPU 111, in step S1002, determines that confirmation for all button nodes has ended, the processing proceeds to step S1007. In step S1007, the CPU 111 generates a custom menu screen as is illustrated in FIG. 4A, for example, by arranging buttons, based on the states set in step S1005 or in step S1006, the my button 404, the share button 405, or the like, on the background image.

Note that configuration may also be taken such that positions of components of the menu screen are prepared as a template file of an XML format, an HTML format, or the like, and the form of the screen can change. To put it differently, please take note that if it is possible to obtain information that is necessary for generation of the screen; the approach to generation of the screen at a final stage is not limited.

By this processing, when the menu screen is displayed, the MFP displays a button in a form in which a function corresponding to the button cannot be instructed if an application that executes the function is not registered. By this processing, a user can be notified that the function of a button cannot be executed.

Figure 11:
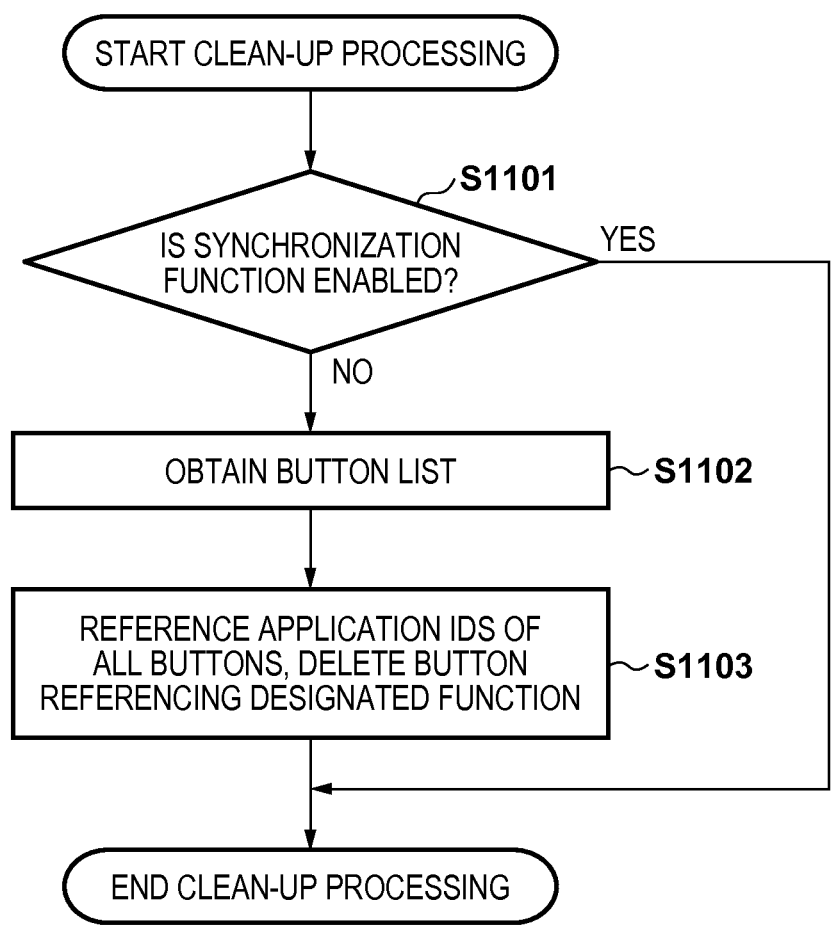
FIG. 11 is a flowchart for describing processing for an inconsistent button by a button clearing module of the MFP according to the first embodiment.

FIG. 11 is a flowchart for describing processing for an inconsistent button by the button clearing module 603 of the MFP 101 according to the first embodiment. Also, this processing is realized by the CPU 111 executing a program stored in the ROM 113 or the external memory 120.

Firstly, in step S1101, the CPU 111 queries as to whether or not the synchronization function of the synchronization control module 205 is enabled, and if the synchronization function is enabled, ends this clean-up processing. Meanwhile, when the CPU 111 determines that the synchronization function is disabled in step S1101, the processing proceeds to step S1102, and the CPU 111 obtains all of the button nodes 752 from the settings synchronization DB 206. Next, the processing proceeds to step S1103, the CPU 111 references the application ID keys 754 from the button nodes 752 obtained in step S1102, and determines if there is anything that matches the application ID 742 that is the deletion target designated by the source of the request for the clean-up processing. Then, if there is a match, that button node 752 is deleted. This processing is executed for all of the obtained button nodes 752, and the clean-up processing ends.

By this processing, in a case where the synchronization function is not enabled, when an application that executes a particular function is disabled or uninstalled, a button corresponding to the function can be deleted from the menu screen. If the synchronization function is enabled, the button is not deleted. This is because in a state in which the synchronization function is enabled, when the button is deleted, the information of the server side may be updated as well, and a button that may be usable on another apparatus may be deleted. Accordingly, in the embodiment, because a button is not deleted in an environment in which the synchronization function is enabled, it is possible to hold a button that may be usable on another apparatus. For this reason, there is the effect that the need to register a button once again is eliminated.

Figure 12:
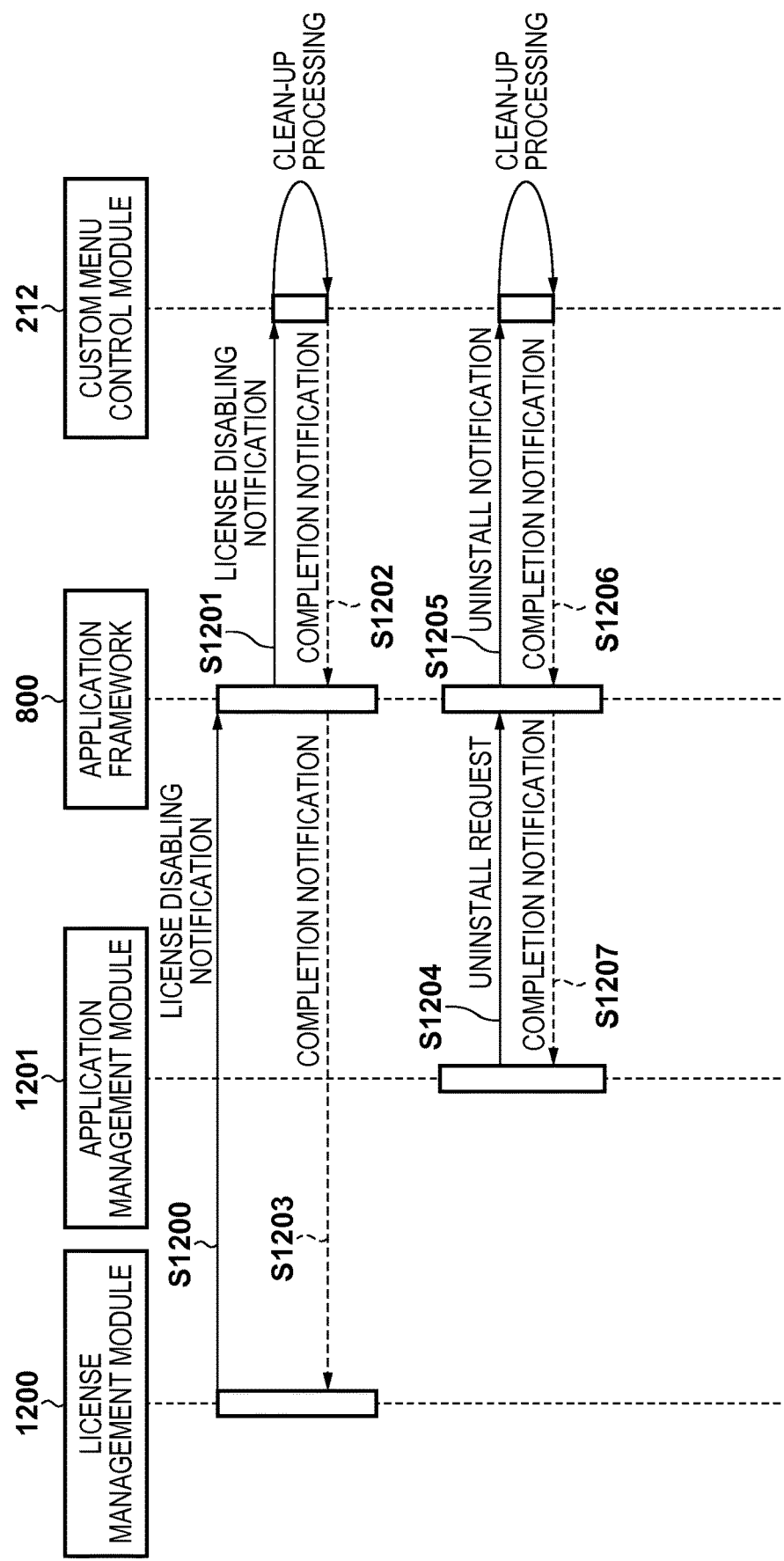
FIG. 12 is a sequence diagram for describing a procedure for a case in which a function of the MFP (an application) is disabled or uninstalled according to the first embodiment.

FIG. 12 is a sequence diagram for describing a procedure for a case in which a function of the MFP 101 (an application) is disabled or uninstalled according to the first embodiment. Also, this processing is realized by the CPU 111 executing a program stored in the ROM 113 or the external memory 120.

Other than those added by installing software, there are functions that are already stored in the ROM 113 or the RAM 112. In a case of the latter, by registering identification information called a license in a license management module 1200 which exists in the ROM 113 or the RAM 112, it is possible to enable or disable the function. In this way, the license management module 1200 has a function of determining the validity of a license of a user input via the touch panel 118, and adaptively enabling/disabling the function. Also, an application management module 1201 existing in the ROM 113 or the RAM 112 has a function for requesting the application framework 800 to add or delete a function.

These requests are based on requests from the touch panel 118 or an information processing apparatus (not shown) connected by the network 102 to the MFP 101.

Firstly, in step S1200, the license management module 1200 makes a notification of disabling of a license to the application framework 800. At this time, the application ID 742 of the function that is the target of disabling is included in the notification. Next, the application framework 800 communicates to the custom menu control module 212 a notification of the disabling of this license, and clean-up processing for inconsistent buttons is performed by the button clearing module 603 (step S1201). Then, processing accompanying disabling of the license ends upon reception of a completion notification from the respective functions in step S1202 and in step S1203.

Next, the processing proceeds to step S1204, and the application management module 1201 makes an uninstall notification to the application framework 800. The application framework 800 makes an uninstall notification to the custom menu control module 212, and inconsistent button clean-up processing is performed by the button clearing module 603 (step S1205). Then, processing accompanying the uninstall notification ends upon reception of a completion notification from the respective functions in step S1206 and in step S1207.

Figure 13:
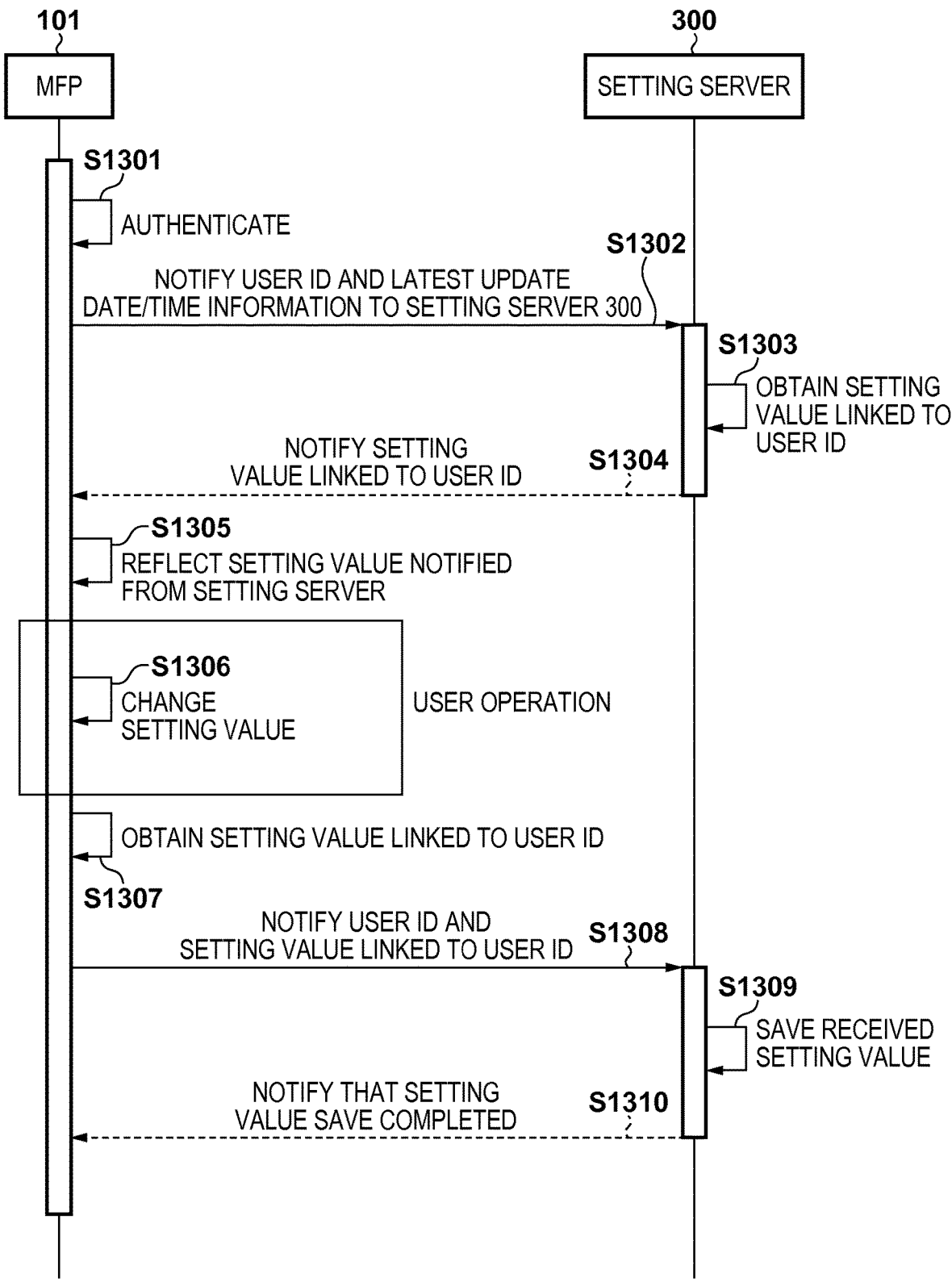
FIG. 13 is a sequence diagram for explaining setting value synchronization processing which is executed between the MFP and a setting server in the information processing system according to the first embodiment.

FIG. 13 is a sequence diagram for explaining setting value synchronization processing which is executed between the MFP 101 and the setting server 300 in the information processing system according to the first embodiment. Note that for processing by the MFP 101 in the sequence diagram is realized by the CPU 111 of the MFP 101 controlling components through the system bus 110 and I/Fs by the CPU 111 executing a program stored in the ROM 113 or the external memory 120.

In step S1301, the CPU 111 performs authentication of a user of the MFP 101. More specifically, when a user inputs a user ID and a password via the touch panel 118, the CPU 111 verifies that the user ID and the password were saved in the MFP 101 beforehand. Then, if the user ID and the password are matching, it is determined to be the user for which usage is permitted. In this way, when the authentication of the user succeeds, the processing proceeds to step S1302, and the CPU 111 transmits to the setting server 300 a user ID indicating a user ID of the authenticated user, and latest update date/time information indicating a date/time at which setting information is last obtained from the setting server 300. With this, the setting server 300 receives the user ID and the latest update date/time information from the MFP 101. Then the processing proceeds to step S1303, and the setting server 300, based on the user ID and the latest update date/time information transmitted from the MFP 101, obtains setting information of the user. Furthermore, the setting server 300 identifies user setting information updated at a new timing by the date/time indicated by the latest update date/time information. Then, in step S1304, the setting server 300 transmits setting information of the identified user to the MFP 101. With this, the MFP 101 obtains the setting information from the setting server 300 and stores the setting information in the settings synchronization DB 206. Then, in step S1305, the CPU 111 reflects the setting information of the user obtained from the setting server 300 in the MFP 101.

After that, the user executes any user operation; as an example thereof, the user, in step S1306, changes a particular setting value. Here, when setting information stored in the settings synchronization DB 206 is changed, the MFP 101 saves the user setting information stored in the settings synchronization DB 206 by transmitting the setting information to the setting server 300 at a predetermined timing after the processing based on the instruction by the user is executed. Note that in the first embodiment, it is assumed that user setting information is saved to the setting server 300 when an instruction for logging out is accepted as the predetermined timing. Note that the timing is not limited to upon log out, and may be a timing at which the execution of a copy job, a print job, or the like is instructed, for example, or may be a timing at which a job ends normally. Also, it may be a timing at which a user instructs a save to the setting server 300 explicitly.

Specifically, when, in step S1307, the CPU 111 accepts a log out instruction, the CPU 111 obtains setting information stored in the settings synchronization DB 206 that corresponds to the user ID of the login user. Then, in step S1308, the CPU 111 executes user logout processing by transmitting to the setting server 300 a user ID and setting information corresponding to the user ID which is obtained in step S1307. With this, the setting server 300 receives user setting information transmitted from the MFP 101, and in step S1309 the setting server 300 saves the received user setting information to the master settings DB 301. Then, in step S1310, the setting server 300 transmits to the MFP 101 completion information that indicates that saving completed, and the MFP 101 receives the save completion information from the setting server 300.

Then when the user next logs in to the MFP 104, the MFP 104 transmits to the setting server 300 a user ID indicating the user ID of the user authenticated by the MFP 104 and latest update date/time information indicating the date/time that the setting information was last obtained from the setting server 300. With this, the setting server 300 obtains corresponding user setting information based on the user ID and the latest update date/time information transmitted from the MFP 104, and transmits the obtained user setting information to the MFP 104. In this way, the user of the MFP 104 can display the same custom menu screen using the same setting information as set by the MFP 101.

As explained above, according to the first embodiment, in a case where a synchronization function is enabled when a function that an MFP has is disabled or uninstalled, a button associated with the function is not deleted. Additionally, by displaying in a way that the button cannot be selected on the custom menu screen, a user can understand easily that a function corresponding to the button cannot be used. Meanwhile, to insure against a case where the function is usable on another MFP, the button continues to be usable. Also, in a case where the synchronization function is disabled, because a button related to the function is deleted from the screen, a button that cannot be used stops being displayed on the custom menu screen. With this, the convenience of the user is improved.

Second Embodiment

In a second embodiment, explanation is given for an example in which, in a case where disabling or uninstallation of a function (application) occurs, clean-up processing is executed on an associated button upon shutdown of the application framework 800. Note that recitations related to components or processing that are the same as in the previously described first embodiment are omitted, and clear recitation is given for differing parts. More specifically, the hardware configuration and software configuration, and the flows and sequences explained with reference to FIG. 1 to FIG. 11 and FIG. 13 are common to the first embodiment, and only the timing of the clean-up processing explained in FIG. 12 differs to the previously described first embodiment.

Figure 14:
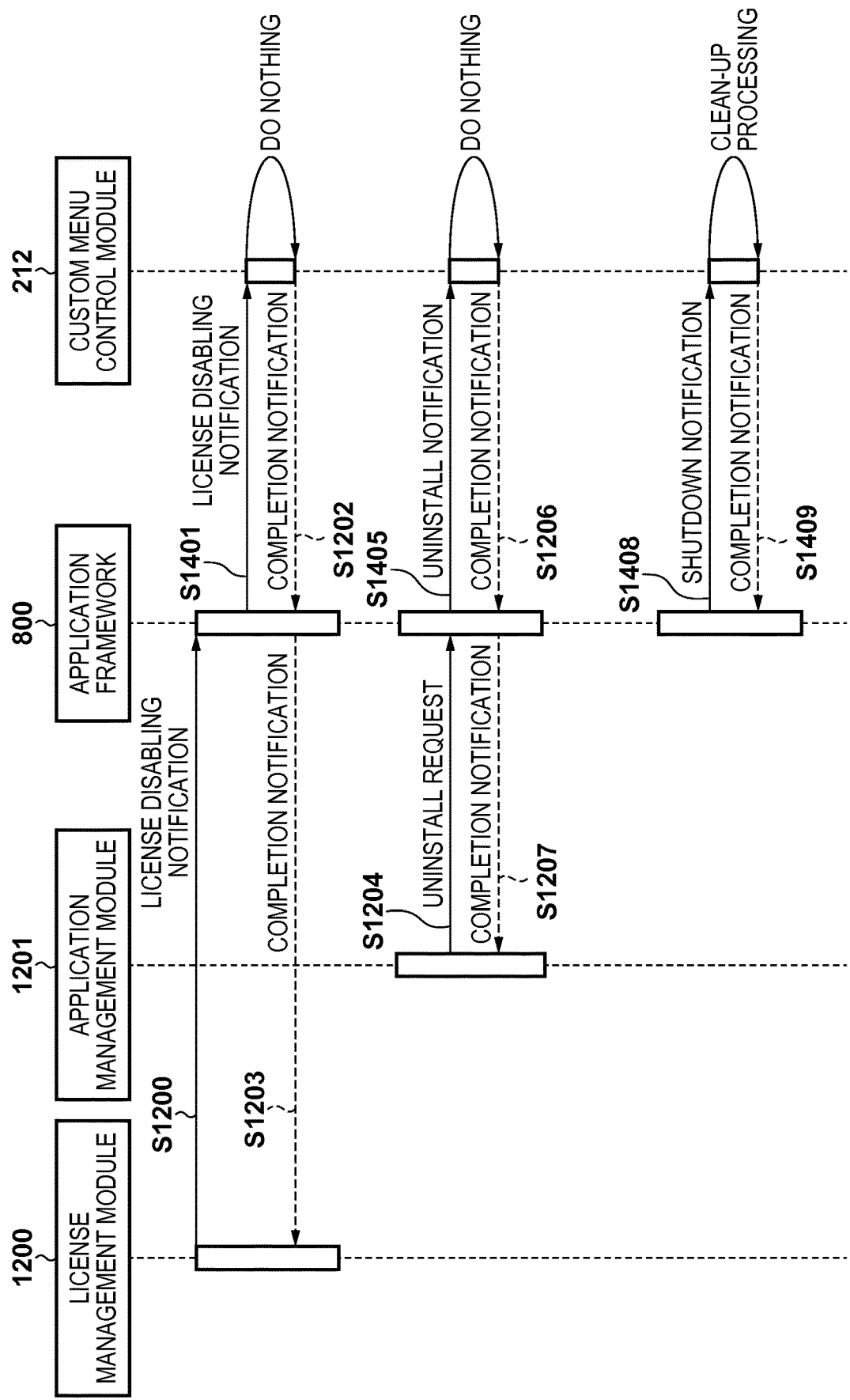
FIG. 14 is a sequence diagram for describing a procedure for a case in which a function of the MFP (an application) is disabled or uninstalled according to a second embodiment of the present invention.

FIG. 14 is a sequence diagram for describing a procedure for a case in which a function of the MFP 101 (an application) is disabled or uninstalled according to the second embodiment of the present invention. Also, this processing is realized by the CPU 111 executing a program stored in the ROM 113 or the external memory 120. Note that in FIG. 14, portions common to previously described FIG. 12 are illustrated with the same reference numerals.

Firstly, in step S1200, the license management module 1200 makes a notification of disabling of a license to the application framework 800. At this time, the application ID 742 of the function that is the target of disabling is included in the notification. Next, the application framework 800, in step S1401, notifies the custom menu control module 212 of disabling of a license, but unlike in previously described FIG. 12, the custom menu control module 212 does not perform the clean-up processing at this time. However, in step S1401 a node that matches the application ID 742 communicated from the application framework 800 is deleted from the application list node 741. Then, processing accompanying disabling of the license ends upon reception of a completion notification from the respective functions in step S1202 and in step S1203.

Next, in step S1204, and the application management module 1201 makes an uninstall notification to the application framework 800. At this time, in step S1405, the application framework 800 notifies the custom menu control module 212 of uninstallation, but unlike in the previously described FIG. 12, the custom menu control module 212 does not perform the clean-up processing. However, in step S1405 a node that matches the application ID 742 communicated from the application framework 800 is deleted from the application list node 741. Then the uninstall notification ends upon reception of a completion notification from the respective functions in step S1206 and in step S1207.

Next, a shutdown request to the application framework 800 is generated accompanying the shutdown of the MFP 101. With this, in step S1408, the application framework 800 makes a shutdown notification of a function (application) that is registered. In the second embodiment, the shutdown notification is made from the application framework 800 to the custom menu control module 212. At this time, the custom menu control module 212 obtains the application ID key 754 from all of the button nodes 752, obtains all of the application IDs 742 from the application list nodes 741, and identifies the deleted function. Then, designating the identified application ID 742, inconsistent button clean-up processing is performed by the button clearing module 603. Next, in step S1409, the custom menu control module 212 makes a completion notification to the application framework 800, and ends the processing. Note that in this sequence, clean-up processing is performed upon shutdown, but note that the clean-up processing may be performed upon activation.

As explained above, according to the second embodiment, clean-up processing is not performed when a function that the MFP has is disabled or uninstalled, but rather the clean-up processing is performed upon shutdown. With this, because contention does not occur with the clean-up processing while the user uses the MFP 101, the user can use the MFP without a responsiveness of the MFP degrading.

Third Embodiment

In a third embodiment, explanation is given of an example in which the timing of the execution of the clean-up processing differs to that in the previously described first and second embodiments. Note that recitations related to components or processing that are the same as in the previously described second embodiment are omitted, and clear recitation is given for differing parts. More specifically, the hardware configuration and software configuration, and the flows and sequences explained with reference to FIG. 1 to FIG. 11 and FIG. 13 are common to the first embodiment. The timing of the clean-up processing explained with reference to FIG. 14 of the second embodiment differs to that in the third embodiment.

FIG. 15 is a sequence diagram for describing a procedure for a case in which a function of the MFP 101 (an application) is disabled or uninstalled according to the third embodiment of the present invention. Also, this processing is realized by the CPU 111 executing a program stored in the ROM 113 or the external memory 120. Note that in FIG. 15, portions common to previously described FIG. 14 are denoted with the same reference numerals.

Firstly, in step S1200, the license management module 1200 makes a notification of disabling of a license to the application framework 800. At this time, the application ID 742 of the function that is the target of disabling is included in the notification. Next, the application framework 800, in step S1401, notifies the custom menu control module 212 of disabling of the license. At this time the custom menu control module 212 does not perform the clean-up processing unlike in the case of FIG. 12 of the first embodiment. However, in step S1401 a node that matches the application ID 742 notified from the application framework 800 is deleted from the application list node 741. Then, processing accompanying disabling of the license ends upon reception of a completion notification from the respective functions in step S1202 and in step S1203.

Also, when, in step S1204, uninstallation is requested from the application management module 1201, the application framework 800, in step S1505, makes an uninstall notification to the custom menu control module 212. At that time, the custom menu control module 212 performs inconsistent button clean-up processing by the button clearing module 603. However, a node that matches the application ID 742 notified from the application framework 800 is deleted from the application list node 741. Then for processing accompanying the uninstall notification, a completion notification is received from the respective functions in step S1206 and in step S1207.

Also, when a shutdown request to the application framework 800 accompanying the shutdown of the MFP 101 is generated, the application framework 800, in step S1408, makes a shutdown notification to the registered function (application). In the third embodiment, the shutdown notification is made to the custom menu control module 212. At this time, the custom menu control module 212 obtains the application ID key 754 from all of the button nodes 752, obtains all of the application IDs 742 from the application list nodes 741, identifies the deleted function. Then, designating the identified application ID 742, inconsistent button clean-up processing is performed by the button clearing module 603. Next, in step S1409, the custom menu control module 212 in response to the shutdown notification makes a notification of completion of the processing to the application framework 800, and ends the processing. Note that in this sequence, clean-up processing is performed upon shutdown, but the clean-up processing may be performed upon activation.

As explained above, according to the third embodiment, clean-up processing is performed when the function is uninstalled without performing the clean-up processing when a function that the MFP has is disabled. This envisions a case where a function is not stopped immediately in a case where disabling of the function is performed due to the license. For example, there are cases in which a system becomes unstable when the function is stopped immediately in a case where there is another function that depends on the function when the license becomes disabled. Because the third embodiment takes this into consideration, the convenience of the user is improved because clean-up processing is performed appropriately if the synchronization function is disabled and unnecessary buttons cease to be displayed, even in an arrangement in which a disabled function is stopped upon shutdown.

Fourth Embodiment

Next, explanation is given of a fourth embodiment of the present invention. In the fourth embodiment, processing for deleting a button when the synchronization function is enabled or disabled is described. Note that recitations related to components or processing that are the same as in the previously described first embodiment are omitted, and explanation will be given for differing parts.

Figure 16A:
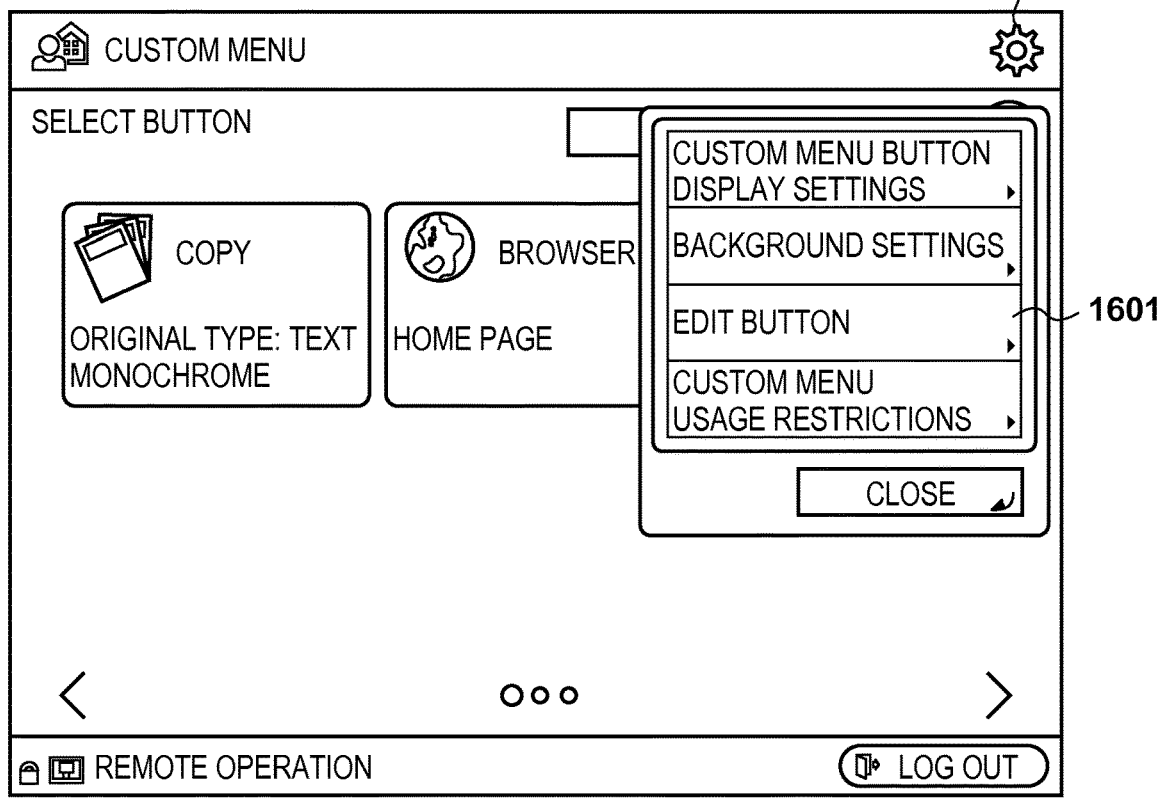
FIGS. 16A and 16B and FIGS. 17A and 17B respectively depict views for illustrating examples of the custom menu screen provided by the custom menu control module of the MFP according to a fourth embodiment.
Figure 16B:
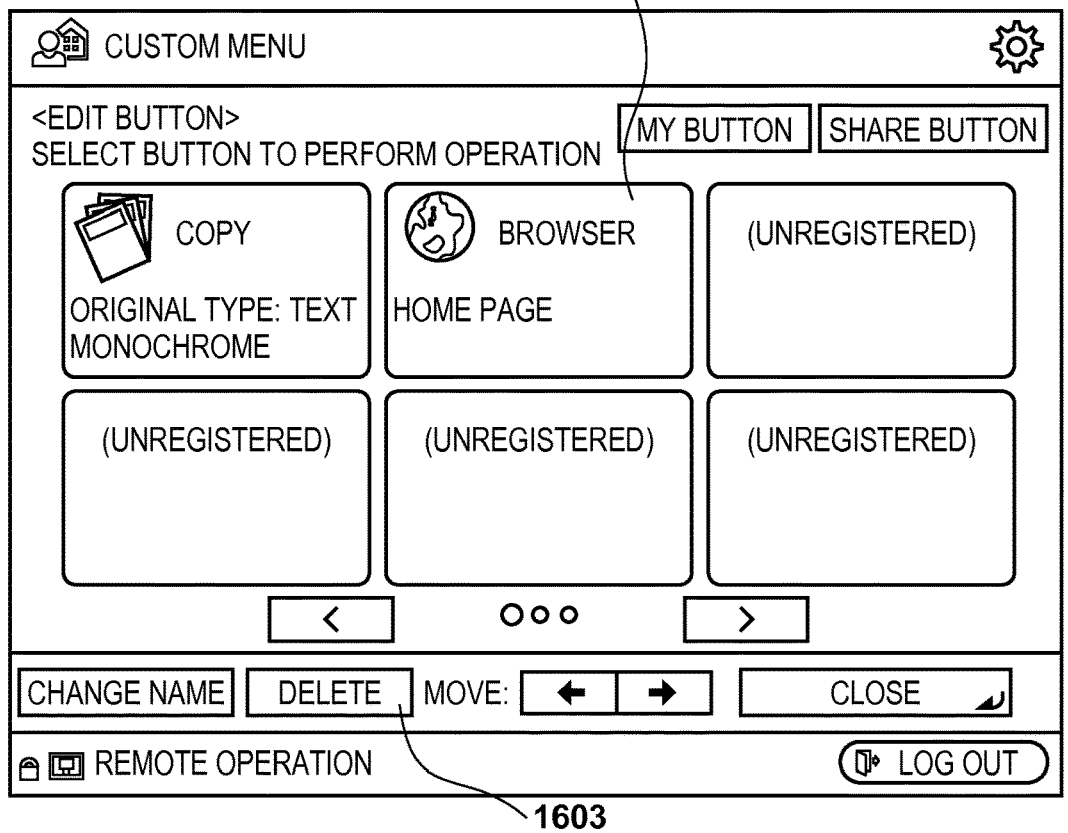

FIG. 16A depicts a view for illustrating an example of a custom menu screen provided by the custom menu control module 212 of the MFP 101 according to the fourth embodiment of the present invention. Here, a state in which a sub-menu is displayed in conjunction with the pressing of the setting button 440 from the custom menu screen is illustrated. Upon the pressing of an "edit button" 1601, a button editing screen illustrated in FIG. 16B is displayed. In FIG. 16B, the button 402 is in a selected state, and upon the pressing of a delete button 1603, a deletion confirmation screen of FIG. 17A or a deletion confirmation screen of FIG. 17B is displayed.

Figure 17A:
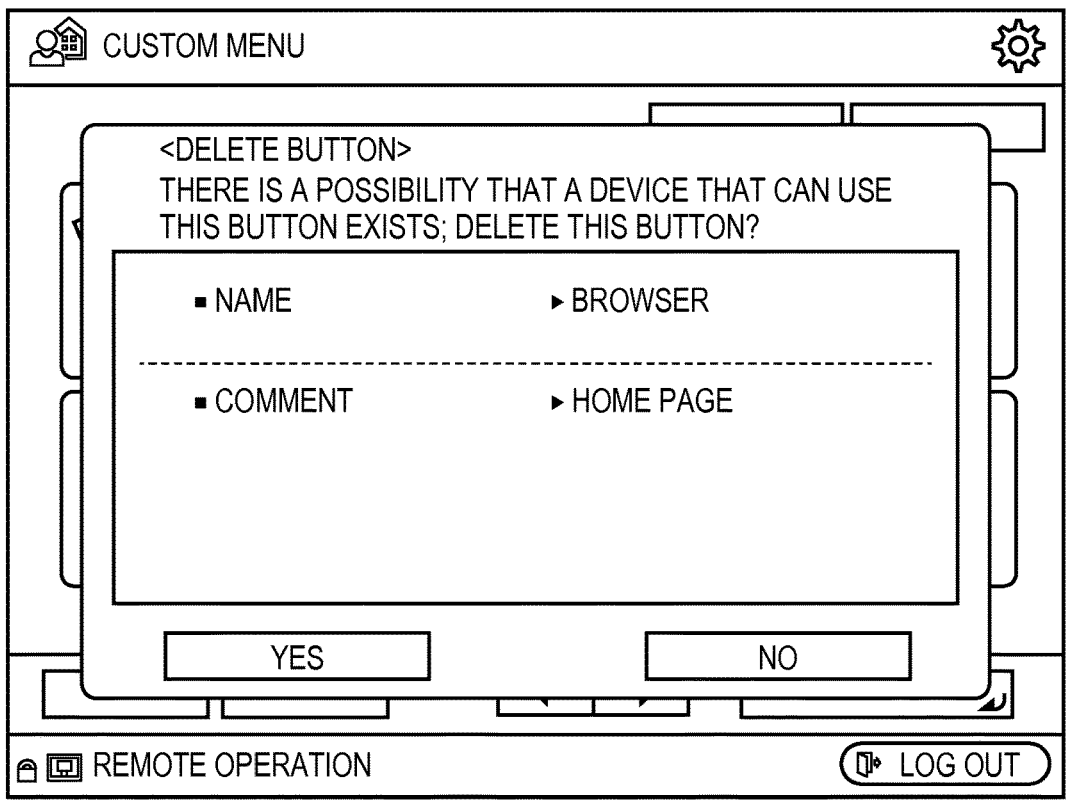
Figure 17B:
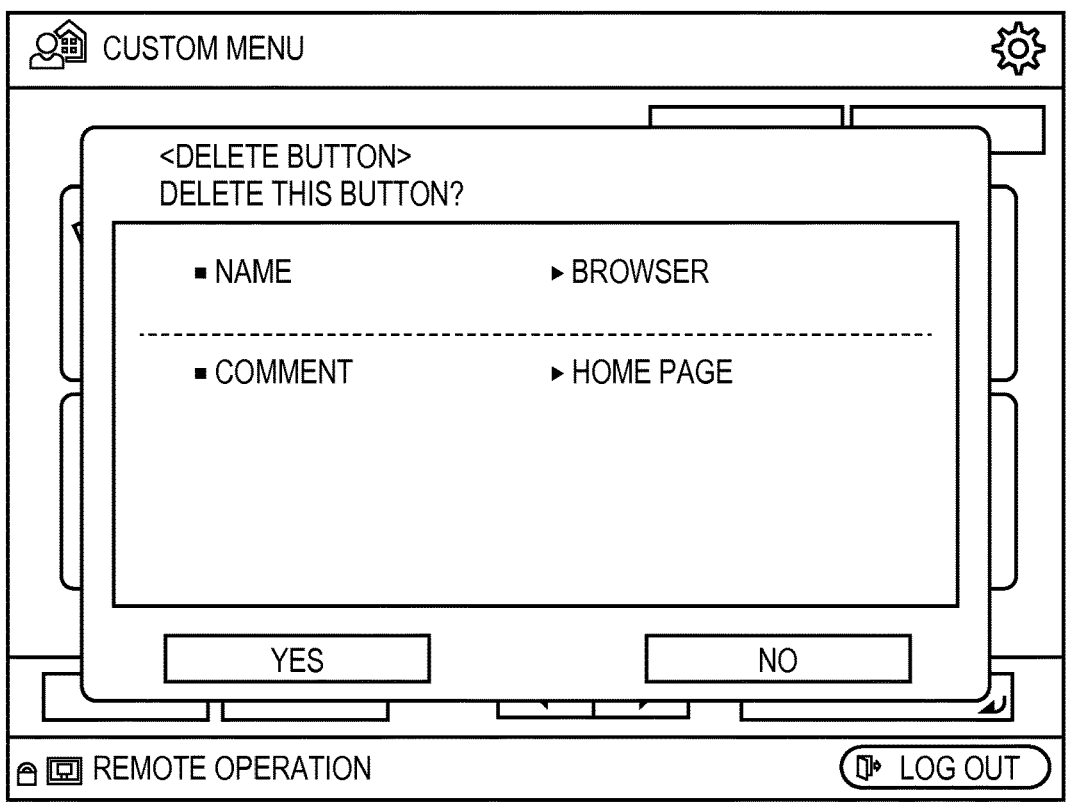

The deletion confirmation screen of FIG. 17A is displayed in a case where the synchronization function is enabled, and the deletion target button 402 is in an inconsistent state. In the fourth embodiment, the confirmation message "There is a possibility that a device that can use this button exists; Delete this button?" is displayed. Meanwhile, a deletion confirmation screen of FIG. 17B is displayed in a case where the synchronization function is disabled, and the confirmation message "Delete this button?" is displayed.

Figure 18:
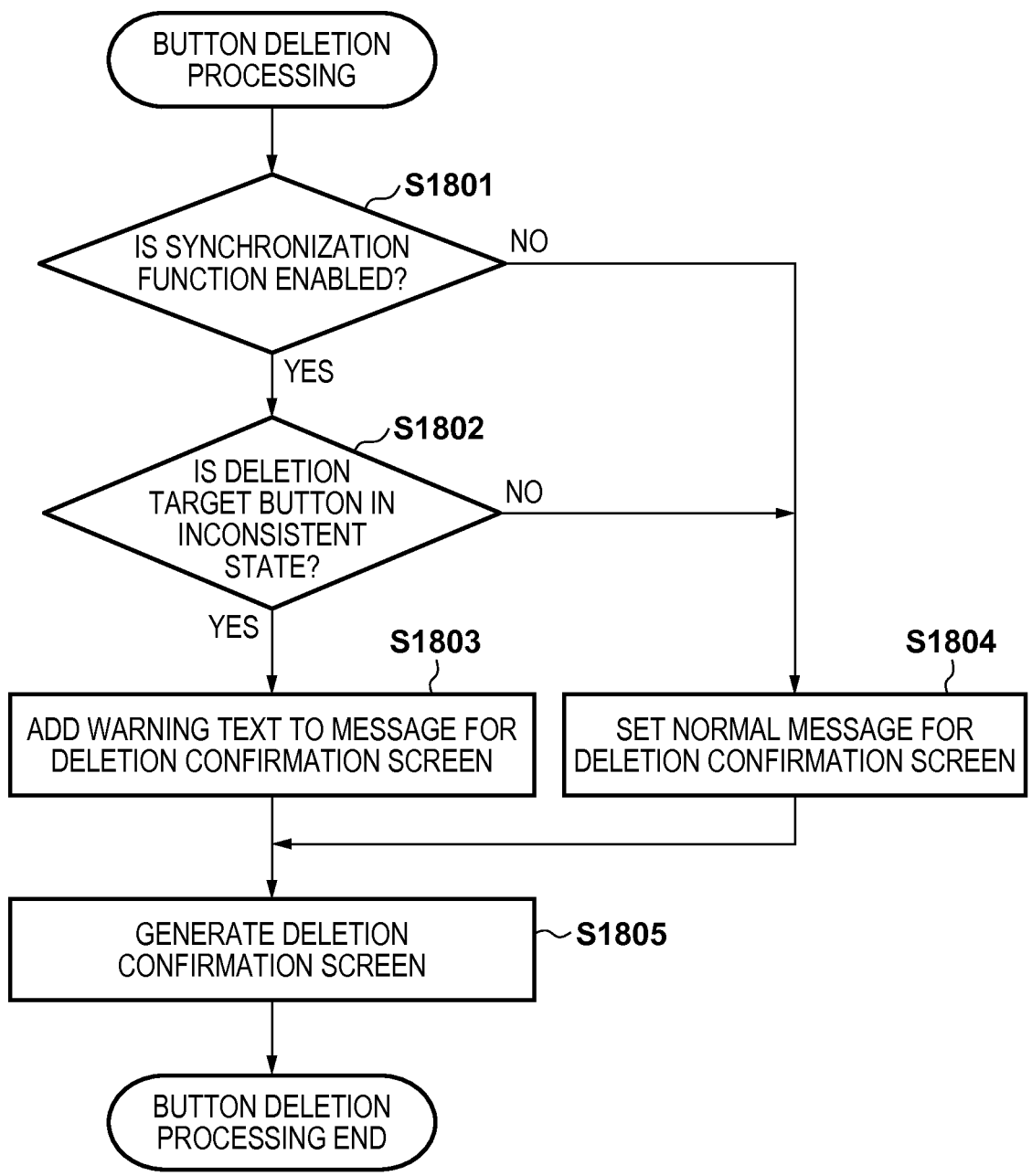
FIG. 18 is a flowchart for describing button deletion processing by the custom menu control module of the MFP according to the fourth embodiment.

FIG. 18 is a flowchart for describing button deletion processing of the custom menu control module 212 of the MFP 101 according to the fourth embodiment. Also, this processing is realized by the CPU 111 executing a program stored in the ROM 113 or the external memory 120.

Firstly, in step S1801, the CPU 111 confirms with the synchronization control module 205 a status of the synchronization function (enabled or disabled), and if the synchronization function is disabled, advances the processing to step S1804. Meanwhile, the CPU 111, in a case where the synchronization function is enabled, advances the processing to step S1802, and the CPU 111 determines whether or not the button that is the deletion target is in an inconsistent state. Note that, whether or not the state is inconsistent is determined by obtaining the application ID key 754 from the button node 752 of the deletion target, and determining whether or not there is a match with all of the application IDs 642 in the application list node 741. It is determined to be inconsistent in a case where none match.

In a case where the CPU 111, in step S1802, determines that the deletion target button is in an inconsistent state, the processing proceeds to step S1803, and the CPU 111 sets content including the message for the deletion confirmation screen as illustrated in FIG. 17A, for example, and the processing proceeds to step S1805. Meanwhile, in step S1802, in a case where the CPU 111 determines that the deletion target button is not in an inconsistent state, the processing proceeds to step S1804, and the CPU 111 sets a deletion confirmation screen including content prompting a normal warning as illustrated in FIG. 17B, and the processing proceeds to step S1805. In step S1805, the CPU 111 generates by the screen generation module 602 a deletion confirmation screen, as is illustrated in FIG. 17A or FIG. 17B, adding the message set in step S1803 or in step S1804.

As explained above, according to the fourth embodiment, in a case where a function that the MFP 101 has is disabled or uninstalled, when a request to delete that button is made, the display of the deletion confirmation screen can be changed in accordance with the state of the synchronization function in a case where the button is in an inconsistent state. With this, it is possible to notify the user of that the synchronization function is enabled and that there is a possibility that a function associated with the button exists on another MFP. For this reason, the user can rethink whether it is really OK to delete in a case where the user is attempting to delete a menu button simply because the user is not using the button currently in the MFP that the user is operating. With this, the effort of once again registering, on another MFP, a menu button that was mistakenly deleted is eliminated, and therefore convenience is improved.

By virtue of the first through fourth embodiments, there is the effect that it is possible to continue to use a button on another information processing apparatus, even when a function is disabled in a case where a button synchronization function is enabled, due to the button which is linked thereto not being deleted.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Note, the present invention is not limited to the embodiment described above, and it is possible to make various modifications or changes without straying from the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-234004, filed Nov. 18, 2014, which is hereby incorporated by reference herein in its entirety.

What is claimed is:

1. An information processing system including a server and a plurality of information processing apparatuses, wherein
the server comprises:
a first memory that stores a set of instructions;
at least one first processor that executes the instructions stored in the first memory to:
store information related to a button to be displayed on a menu screen of each of the plurality of information processing apparatuses, and
the information processing apparatuses comprise:
a second memory that stores a set of instructions;
at least one second processor that executes the instructions stored in the second memory to:
register information related to a button to be displayed on a menu screen displayed on the information processing apparatus, the button being linked to a function of a previously installed application;
store setting information including the registered information, which is a synchronization target;
perform a synchronization of the information stored in the server with the setting information stored in the information processing apparatus;
(i) in a case where an inconsistency related to a previously installed application of the information processing apparatus occurs between the function, to be executed by the previously installed application, corresponding to the information included in the setting information being the synchronization target and a display of the button, delete information related to the button stored in the information processing apparatus, and control to delete the display of the button on the menu screen in a case that the synchronization is disabled,
(ii) in a case where an inconsistency related to the previously installed application of the information processing apparatus occurs between the function, to be executed by the previously installed application, corresponding to the information included in the setting information being the synchronization target and a display of the button, control to change the display state of the button on the menu screen, such that the button cannot be selected, without deleting the information related to et the button being the synchronization target stored in the information processing apparatus in a case that the synchronization is enabled; and
(iii) in a case where an inconsistency related to the previously installed application of the information processing apparatus does not occur between the function, to be executed by the previously installed application, corresponding to the information included in the setting information being the synchronization target and a display of the button, display the button on the menu screen without deleting the information related to the button stored in the information processing apparatus.

2. The information processing system according to claim 1, wherein the inconsistency is due to a previously installed application that executes the function being uninstalled.

3. The information processing system according to claim 1, wherein the inconsistency is due to an authenticated user not having a license of a previously installed application that executes the function.

4. The information processing system according to claim 1, wherein the at least one second processor executes the instructions stored in the second memory to, in a case where the inconsistency occurs between the function corresponding to the information included in the setting information being the synchronization target and the display of the button, display a confirmation screen for confirming with a user whether or not to delete the information of the button if the synchronization is enabled.

5. The information processing system according to claim 1, wherein the at least one second processor executes the control upon a shutdown of the information processing apparatus.

6. The information processing system according to claim 2, wherein the at least one second processor executes the control when a previously installed application that executes the function is uninstalled.

7. The information processing system according to claim 1, wherein the setting information of the menu screen includes at least information for identifying an application registered to the menu screen and a background image, and a name displayed on an icon of the application.

8. An information processing apparatus for communicating with a server, the apparatus comprising:
a display unit configured to display a menu screen;
a memory that stores a set of instructions;
at least one processor that executes the instructions stored in the memory to:
register information related to a button to be displayed the menu screen, the button being linked to a function of a previously installed application;
store setting information which is a synchronization target and includes the registered information;
to perform a synchronization of the stored setting information with the server;
(i) in a case where an inconsistency related to a previously installed application of the information processing apparatus occurs between the function, to be executed by the previously installed application, corresponding to the information included in the setting information being a synchronization target and a display of the button, delete information related to the button stored in the information processing apparatus, and control to delete the display of the button on the menu screen in a case that the synchronization is disabled;
(ii) in a case where an inconsistency related to the previously installed application of the information processing apparatus occurs between the function, to be executed by the previously installed application, corresponding to the information included in the setting information being the synchronization target and a display of the button, control to change the display state of the button on the menu screen, such that the button cannot be selected, without deleting the information related to of the button being the synchronization target stored in the information processing apparatus, in a case that the synchronization is enabled; and (iii) in a case where an inconsistency related to the previously installed application of the information processing apparatus does not occur between the function, to be executed by the previously installed application, corresponding to the information included in the setting information being the synchronization target and a display of the button, display the button on the menu screen without deleting the information related to the button stored in the information processing apparatus.

9. The information processing apparatus according to claim 8, wherein the at least one processor executes the instructions stored in the memory to, in a case where the inconsistency occurs between the function corresponding to the information included in the setting information being the synchronization target and a display of the button, display a confirmation screen for confirming with a user whether or not to delete the information of the button if the synchronization is enabled.

10. The information processing apparatus according to claim 8, wherein the inconsistency is due to a previously installed application that executes the function being uninstalled.

11. The information processing apparatus according to claim 8, wherein the inconsistency is due to an authenticated user not having a license of a previously installed application that executes the function.

12. The information processing apparatus according to claim 8, wherein the at least one processor executes the control upon a shutdown of the information processing apparatus.

13. The information processing apparatus according to claim 10, wherein the at least one processor executes the control when a previously installed application that executes the function is uninstalled.

14. The information processing apparatus according to claim 8, wherein the setting information of the menu screen includes at least information for identifying an application registered to the menu screen and a background image, and a name displayed on an icon of the application.

15. A method of controlling an information processing apparatus for communicating with a server, the method comprising:
 displaying a menu screen;
 registering information related to a button to be displayed on the menu screen, the button being linked to a function of a previously installed application;
 storing setting information which is a synchronization target and includes the registered information;
 performing a synchronization of the stored setting information with the server;
 in a case where an inconsistency related to a previously installed application of the information processing apparatus occurs between the function, to be executed by the previously installed application, corresponding to the information included in the setting information being the synchronization target and a display of the button, deleting information related to the button stored in the information processing apparatus, and controlling to delete the display of the button on the menu screen if the synchronization is disabled;
 in a case where an inconsistency related to the previously installed application of the information processing apparatus occurs between the function, to be executed by the previously installed application, corresponding to the information stored in the information processing apparatus being the synchronization target and a display of the button, controlling to change the display state of the button on the menu screen, such that the button cannot be selected, without deleting the information related to of the button being the synchronization target if the synchronization is enabled; and
 in a case where an inconsistency related to the previously installed application of the information processing apparatus does not occur between the function, to be executed by the previously installed application, corresponding to the information included in the setting information being the synchronization target and a display of the button, controlling to display the button on the menu screen without deleting the information related to the button stored in the information processing apparatus.

16. A non-transitory computer-readable storage medium storing a program for causing a computer that communicates with a server to execute:
 a display procedure of displaying a menu screen to a display unit;
 a registration procedure of registering information related to a button to be displayed on the menu screen, the button being linked to a function of a previously installed application;
 a storage procedure of storing in a storage unit setting information which is a synchronization target and includes the registered information;
 a synchronization control procedure of performing a synchronization of the setting information between the server and the storage unit; and
 a control procedure of, (i) in a case where an inconsistency related to a previously installed application of the information processing apparatus occurs between the function, to be executed by the previously installed application, corresponding to the information included in the setting information being the synchronization target and a display of the button, deleting information related to the button stored in the information processing apparatus, and controlling to delete the display of the button on the menu screen if the synchronization between the server and the storage unit is disabled,
 (ii) in a case where an inconsistency related to the previously installed application of the information processing apparatus occurs between the function, to be executed by the previously installed application, corresponding to the information stored in the information processing apparatus being the synchronization target and a display of the button, controlling to change the display state of the button on the menu screen, such that the button cannot be selected, without deleting the information related to of the button being the synchronization target if the synchronization is enable; and
 (iii) in a case where an inconsistency related to the previously installed application of the information processing apparatus does not occur between the function, to be executed by the previously installed application, corresponding to the information included in the setting information being the synchronization target and a display of the button, controlling to display the button on the menu screen without deleting the information related to the button stored in the information processing apparatus.

* * * * *